(12) United States Patent
Qu et al.

(10) Patent No.: US 9,625,932 B2
(45) Date of Patent: Apr. 18, 2017

(54) SWITCHING MODE CONVERTER HAVING 100% DUTY CYCLE MODE AND METHOD FOR CONTROLLING THEREOF

(71) Applicant: Silicon Works Co., Ltd., Daejeon (KR)

(72) Inventors: Wanyuan Qu, Daejeon (KR); Young Jin Woo, Daejeon (KR); Jin Yong Jeon, Daejeon (KR); Dae Keun Han, Daejeon (KR); Young Suk Son, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 0 days.

(21) Appl. No.: 13/954,156

(22) Filed: Jul. 30, 2013

(65) Prior Publication Data

US 2014/0062449 A1 Mar. 6, 2014

(30) Foreign Application Priority Data

Sep. 5, 2012 (KR) .................. 10-2012-0098398
Sep. 5, 2012 (KR) .................. 10-2012-0098402
Sep. 5, 2012 (KR) .................. 10-2012-0098406

(51) Int. Cl.
*H02M 3/158* (2006.01)
*G05F 3/02* (2006.01)
*H02M 1/36* (2007.01)

(52) U.S. Cl.
CPC .............. *G05F 3/02* (2013.01); *H02M 1/36* (2013.01); *H02M 3/1582* (2013.01); *H02M 3/1584* (2013.01); *H02M 3/1588* (2013.01); *Y02B 70/1466* (2013.01)

(58) Field of Classification Search
CPC ................... H02M 3/1584; H02M 3/1582

USPC ............... 323/282, 266; 327/109; 326/88
See application file for complete search history.

(56) References Cited

U.S. PATENT DOCUMENTS

| 3,746,946 A | * | 7/1973 | Clark ........................ 257/360 |
| 4,367,437 A | * | 1/1983 | Mikami ..................... 323/349 |
| 5,627,460 A | | 5/1997 | Bazinet et al. |
| 5,963,439 A | | 10/1999 | Wuidart et al. |
| 6,064,187 A | | 5/2000 | Redl et al. |

(Continued)

FOREIGN PATENT DOCUMENTS

| JP | 2007-195361 | 8/2007 |
| JP | 2008283794 A | 11/2008 |

(Continued)

*Primary Examiner* — Harry Behm
*Assistant Examiner* — Peter Novak
(74) *Attorney, Agent, or Firm* — Mintz Levin Cohn Ferris Glovsky and Popeo, P.C.; Kongsik Kim; Colleen H. Witherell

(57) ABSTRACT

Disclosed herein are a switching mode converter and a method for controlling thereof. The switching mode converter includes a switching element, a bootstrap capacitor, and a control unit. The switching element is connected between one side of a first semiconductor device, another side of the first semiconductor device is connected to a ground, and an input power. The bootstrap capacitor is configured such that one side of the bootstrap capacitor is connected to the one side of the first semiconductor device. The control unit controls the output current or output voltage of a common charge pump provided to the switching element and the bootstrap capacitor in order to control the charging state of the bootstrap capacitor and the gate voltage of the switching element.

12 Claims, 23 Drawing Sheets

(56) References Cited

U.S. PATENT DOCUMENTS

| | | | |
|---|---|---|---|
| 6,172,493 B1 | 1/2001 | Grant | |
| 6,201,717 B1 | 3/2001 | Grant | |
| 6,229,292 B1 | 5/2001 | Redl et al. | |
| 6,320,449 B1 * | 11/2001 | Capici | H03K 17/04123 323/284 |
| 6,812,782 B2 | 11/2004 | Grant | |
| 6,985,019 B1 * | 1/2006 | Zhou et al. | 327/309 |
| 7,710,167 B2 | 5/2010 | Bernacchia | |
| 7,907,430 B2 * | 3/2011 | Kularatna et al. | 363/59 |
| 8,174,269 B2 | 5/2012 | Eom et al. | |
| 2004/0080963 A1 * | 4/2004 | Grant | 363/59 |
| 2008/0100378 A1 | 5/2008 | Bernacchia | |
| 2011/0156672 A1 | 6/2011 | Gakhar et al. | |

FOREIGN PATENT DOCUMENTS

| | | |
|---|---|---|
| KR | 10-0629591 | 9/2006 |
| KR | 100679993 B1 | 2/2007 |
| KR | 20070091800 A | 9/2007 |
| KR | 100801980 B1 | 3/2008 |
| KR | 20100060999 A | 6/2010 |
| KR | 2012-0073832 | 7/2012 |
| KR | 101478352 B1 | 1/2015 |

* cited by examiner

SWITCHING MODE CONVERTER HAVING 100% DUTY CYCLE MODE AND METHOD FOR CONTROLLING THEREOF

CROSS-REFERENCE TO RELATED APPLICATION

This application claims under 35 U.S.C. §119(a) the benefit of Korean Applications No. 10-2012-0098398 filed on Sep. 5, 2012, No. 10-2012-0098402 filed on Sep. 5, 2012, and No. 10-2012-0098406 filed on Sep. 5, 2012, which applications are incorporated herein by reference.

TECHNICAL FIELD

The present invention relates, in general, to a switching mode converter and, more particularly, to a switching mode converter capable of allowing a System on Chip (SoC) to be implemented and safely providing a bootstrap function, a switching mode converter capable of providing stable 100% duty cycle mode, and a switching mode converter capable of preventing an excessive voltage from being applied to the gate of a switching element because of charges transferred from a charge pump. Furthermore, the present invention relates to a method of controlling the switching mode converters.

BACKGROUND ART

Conventional buck mode (switching mode) converters use metal oxide semiconductor (MOS) transistors, for example, p-channel MOS (PMOS) or n-channel MOS (NMOS) devices, as switching elements. In the case of a switching mode converter that operates at output voltage, the switching mode converter increases the duty cycle D in order to increase the ON-time of a switching element when input voltage drops. In this case, the duty cycle D may be defined as a value that is obtained by multiplying the ON-time of the switching element by the switching frequency of the switching element.

The switching mode converter is limited to a specific maximum duty cycle. In the case of a buck converter that uses a PMOS as a switching element, the duty cycle may be increased by 100% because the gate of the PMOS can be simply pulled down to a ground GND.

However, although a PMOS output device has higher performance than an NMOS device, the PMOS output device is disadvantageous in that the cost thereof is higher than the NMOS device.

When an NMOS is used as a switching element, a method of applying a voltage, which is higher than that applied to the source of the NMOS, to the gate of the NMOS is required. According to conventional technology, a higher voltage is applied to the gate using a bootstrap capacitor and a diode. That is, a conventional switching mode converter illustrated in FIG. 1 includes a high-side drive unit 20, a low-side drive unit 22, a high-side switch transistor 24, a low-side switch transistor 26, a diode 28, a bootstrap capacitor 30, an inductor 32, an output capacitor 34, an output load resistor 36, and an input voltage $V_{IN}$.

The conventional technology is disadvantageous in that the converter should keep the duty cycle lower than the 100% duty cycle in order to recharge the bootstrap capacitor. Accordingly, when the 100% duty cycle is required because the input supply voltage drops, a problem arises in that some components cannot operate.

In order to overcome the above problem, another conventional technology employs a high-power charge pump in order to provide the complete high-side gate drive regardless of whether a 100% duty cycle is applied. However, the high-power charge pump is disadvantageous in that it is very expensive in the silicon region (or on a silicon basis), has very high cost because additional external capacitors are used, and is subject to many external influences.

Furthermore, since the conventional technology using a high-power charge pump is designed to allow the amount of charge transferred from the charge pump to be large, the gate voltage of the high-side switch may increase to a voltage above a required voltage, with the result that there is a strong possibility of the high-side switching element being damaged.

Accordingly, a method of preventing an excessive voltage from being applied to the gate of the switching element is required. As illustrated in FIG. 2, in a conventional asynchronous switching mode converter configured to prevent an excessive voltage from being applied, charges output from a charge pump 40 are additionally charged in a bootstrap capacitor 30 through a current source 42, and a Zener diode 44 is connected to the gate and source terminals of a switching element 24 to which the charging voltage of the bootstrap capacitor 30 is applied, thereby adjusting a voltage applied to the gate and source terminals of the switching element 24 to a uniform value. In this case, FIG. 2 illustrates the asynchronous switching mode converter, in which the low-side switch illustrated in FIG. 1 has been replaced with a diode 46.

However, the process utilizing a Zener diode is provided by only limited vendor, the prices of products utilizing a Zener diode increase. In particular, in the case of products applied to vehicles or automotives, the choice of process is more limited if one wants to use a Zener diode in an IC chip.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Accordingly, the present invention has been made to solve the above problems occurring in the prior art, and an object of the present invention is to provide a switching mode converter and a method of controlling the same, which can allow an SoC(System on a Chip) to be implemented and safely provide a bootstrap function.

More specifically, the present invention is intended to control the output current of a current source connected to the output terminal of a common charge pump, so that the charging of a bootstrap capacitor and the gate voltage of a switching element can be controlled using the common charge pump and also the switching mode converter included in an SoC can be implemented.

Another object of the present invention is to provide a switching mode converter and a method of controlling the same, which are capable of providing a safe bootstrap function without adding external capacitors.

Another object of the present invention is to provide a switching mode converter and a method of controlling the same, which can allow the switching mode converter included in an SoC to be implemented and safely provide 100% duty cycle mode.

More specifically, the present invention is intended to control the output voltage level of the common charge pump depending on whether the switching element is in 100% duty cycle mode, thereby providing the stable output voltage of the converter even when the input voltage of the switching element drops to a voltage equal to or lower than a specific voltage, controlling the charging of the bootstrap capacitor and the gate voltage of the switching element, and enabling the switching mode converter included in an SoC to be implemented.

Still another object of the present invention is to provide a switching mode converter and a method of controlling the same, which controls a separate reference voltage input to the common charge pump while taking into account the input voltage of the switching element or the output voltage of the converter in 100% duty cycle mode, thereby providing stable 100% duty cycle mode using the common charge pump.

Still another object of the present invention is to provide a switching mode converter and a method of controlling the same, which can provide an excessive voltage protection function that can prevent an excessive voltage from being applied to the gate of the switching element because of charges transferred from the charge pump.

More specifically, the present invention is intended to detect the charging voltage of the bootstrap capacitor and discharge the gate voltage of the switching element if the detected charging voltage of the bootstrap capacitor is equal to or higher than a predetermined specific voltage, thereby preventing the switching element from being damaged because of the application of an excessive voltage to the gate of the switching element.

In accordance with an aspect of the present invention, there is provided a switching mode converter, including a switching element connected between one side of a first semiconductor device and an input power, wherein another side of the first semiconductor device is connected to a ground power; a bootstrap capacitor configured such that one side of the bootstrap capacitor is connected to the one side of the first semiconductor device; and a control unit configured to control the output current or output voltage of a common charge pump provided to the switching element and the bootstrap capacitor in order to control the charging state of the bootstrap capacitor and the gate voltage of the switching element.

The switching mode converter may further include a current source connected between the output terminal of the common charge pump and another side of the bootstrap capacitor, and the control unit may control the output current of the current source.

The control unit may detect the charging voltage of the bootstrap capacitor, and may control the output current of the current source based on the detected charging voltage.

The current source may include a linear regulator, an output current of the linear regulator is linearly controlled by control of the control unit.

The common charge pump may receive one of first and second reference voltages, and may provide an output voltage corresponding to the received one reference voltage to the other side of the bootstrap capacitor; and the control unit may determine whether the duty cycle of the switching element is 100%, and may determine one of the first and second reference voltages is input to the common charge pump depending on whether the duty cycle is 100%.

The control unit may adjust the voltage level of the second reference voltage while taking into account the voltage level of the input power, and may input the second reference voltage having the adjusted voltage level to the common charge pump.

The control unit may adjust the voltage level of the second reference voltage while taking into account the output voltage of the switching mode converter, and may input the second reference voltage having the adjusted voltage level to the common charge pump.

The control unit may determine that the duty cycle is 100% if the detected ON-time of the switching element is equal to or longer than a predetermined reference time upon detecting the ON-time or if the detected charging voltage of the bootstrap capacitor is equal to or lower than a predetermined threshold voltage upon detecting the charging voltage.

In accordance with another aspect of the present invention, there is provided a switching mode converter, including a switching element connected to one side of a first semiconductor device and an input power, wherein another side of the first semiconductor is connected to a ground power; a bootstrap capacitor connected to the one side of the first semiconductor device and a charge pump; a discharge unit connected to the gate of the switching element and the ground power; and a control unit configured to control the discharge unit so that the gate voltage of the switching element is discharged through the discharge unit if a voltage equal to or higher than a predetermined threshold voltage is applied to the gate of the switching element.

The control unit may detect the charging voltage of the bootstrap capacitor, and may determine that the gate voltage of the switching element is equal to or higher than the threshold voltage if the detected charging voltage is equal to or higher than a predetermined first voltage.

The control unit may control the discharge unit so that the gate voltage of the switching element can be discharged through the discharge unit after the switching element has been turned off.

In accordance with still another aspect of the present invention, there is provided a method of controlling a switching mode converter, including charging a bootstrap capacitor configured such that one side thereof is connected to one side of a first semiconductor device, another side of the first semiconductor is connected to a ground power; turning on a switching element connected between the one side of the first semiconductor device and an input power; and controlling the output current or output voltage of a common charge pump provided to the switching element and the bootstrap capacitor in order to control the charging state of the bootstrap capacitor and the gate voltage of the switching element.

In accordance with still another aspect of the present invention, there is provided a method of controlling a switching mode converter, including charging a bootstrap capacitor configured such that one side thereof is connected to one side of a first semiconductor device, another side of the first semiconductor is connected to a ground power; turning on a switching element connected between the one side of the first semiconductor device and an input power; determining whether a voltage equal to or higher than a predetermined threshold voltage is applied to the gate terminal of the switching element; and discharging the voltage of the gate terminal of the switching element through a discharge path if a voltage equal to or higher than the predetermined threshold voltage is applied to the gate terminal of the switching element.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

The terms used herein are used merely to describe specific embodiments, but are not intended to limit the present invention. The singular expressions include plural expressions unless explicitly stated otherwise in the context thereof. It should be appreciated that in this application, the use of the terms "include(s)," "comprise(s)", "including" and "comprising" is intended to denote the presence of the characteristics, numbers, steps, operations, elements, or components described herein, or combinations thereof, but is not intended to exclude the probability of presence or addition of one or more other characteristics, numbers, steps, operations, elements, components, or combinations thereof.

Unless defined otherwise, all terms used herein, including technical terms or scientific terms, have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

Preferred embodiments of the present invention will be described in detail with reference to the accompanying drawings. In the following description of the present invention, if it is determined that detailed descriptions of related well-known configurations or functions may make the gist of the present invention obvious, the detailed descriptions will be omitted.

However, the present invention is not restricted or limited to the embodiments. The same reference symbols represented throughout the drawings designate the same elements.

A switching mode converter and a method of controlling the same according to embodiments of the present invention will be described in detail with reference to FIGS. 3 to 23.

Figure 1:
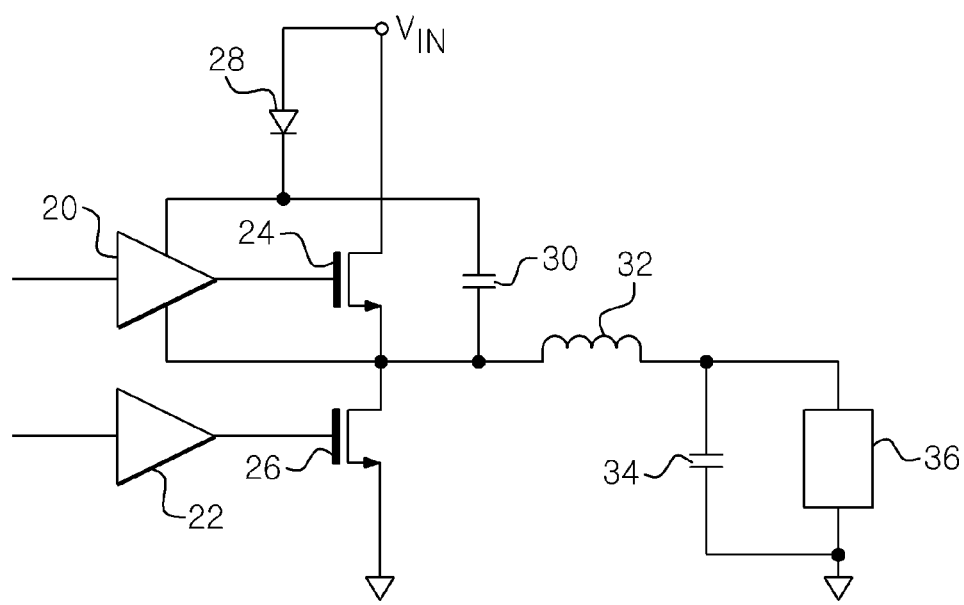
FIG. 1 illustrates the configuration of a conventional synchronous switching mode converter.
Figure 2:
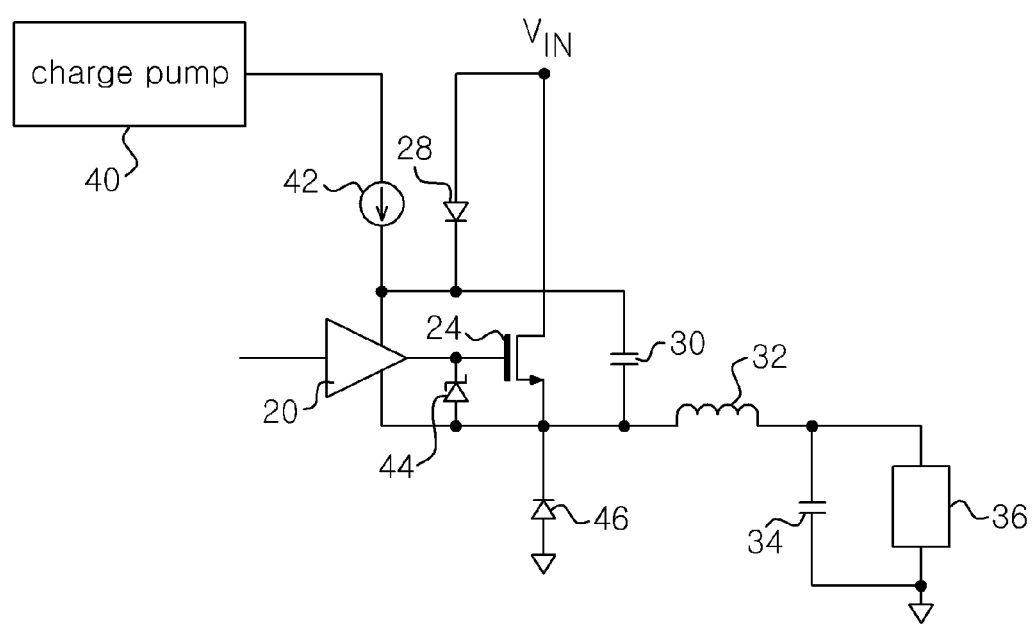
FIG. 2 illustrates the configuration of a conventional switching mode converter having an excessive voltage protection function.
Figure 3:
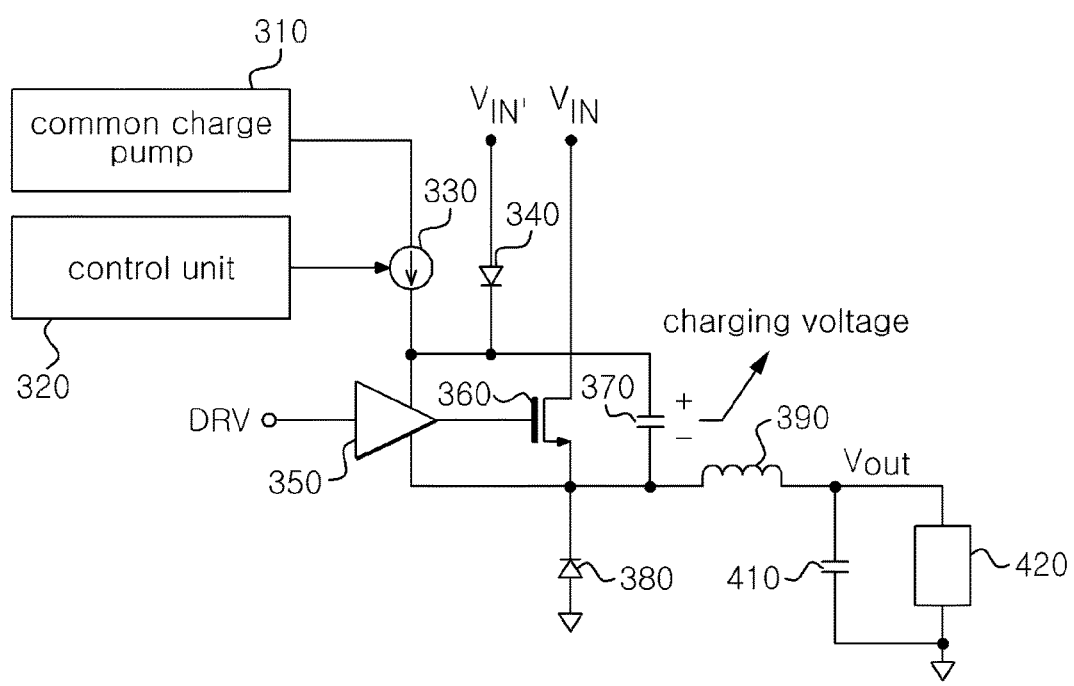
FIG. 3 illustrates the configuration of an SoC-enabling switching mode converter according to an embodiment of the present invention.

FIG. 3 illustrates the configuration of a switching mode converter according to an embodiment of the present invention. That is, FIG. 3 illustrates the configuration of an asynchronous switching mode converter.

Referring to FIG. 3, the switching mode converter according to this embodiment of the present invention includes a common charge pump 310, a control unit 320, a current source 330, a first diode 340, a switching element drive unit 350, a switching element 360, a bootstrap capacitor 370, a second diode 380, and an inductor 390.

The common charge pump 310 is a charge pump that supplies charges not only to the switching mode converter of this embodiment but also to other components that require additional charges and implemented on the same IC chip or device as the switching mode converter, such as a low dropout (LDO) regulator. That is, the common charge pump 310 is a charge pump that is used in common by components that require the charge pump in an IC chip or in a product, for example, a controller of vehicle or automotive.

The bootstrap capacitor 370 is connected to a node between the second diode 380 and the switching element 360 and to the output terminal of the current source 330, receives a predetermined supply voltage $V_{IN'}$ through the first diode 340, charges itself using the supply voltage $V_{IN'}$ and, if necessary, a current output from the current source 330, and applies the charged voltage as the gate voltage of the switching element 360 under the ON/OFF control of the switching element drive unit 350.

In this case, the bootstrap capacitor 370 may receive the voltage $V_{IN'}$ different from the input voltage $V_{IN}$ input to the drain of the switching element 360 through the first diode 340. The supply voltage $V_{IN'}$ may be a voltage generated using the input voltage $V_{IN}$, or may be a voltage generated using a separate voltage. It will be apparent that although the supply voltage $V_{IN'}$ and the input voltage $V_{IN}$ are described as being different voltages in this embodiment, the spirit of the present invention is not limited thereto, and the input voltage $V_{IN}$ may be used as the supply voltage $V_{IN'}$.

In this case, the input voltage $V_{IN}$ input to the drain of the switching element 360 may be a voltage output directly from a product, for example, the battery of a vehicle or automotive, or may be a voltage input generated by a specific circuit between the battery of the vehicle or automotive and the switching mode converter of this embodiment.

The switching element drive unit 350 inputs the charging voltage of the bootstrap capacitor 370 to the gate of the switching element 360 under the control based on a switching element drive signal, for example, a PWM (Pulse Width Modulated) signal DRV.

When the switching element 360 is turned off by the switching element drive unit 350, the second diode 380 is turned on and the voltage of a node between the second diode 380 and the switching element 360 is lowered to a voltage approximate to 0, in accordance with the operating characteristics of the buck topology of the switching mode converter (e.g., buck converter or boost converter or buck-boost converter, etc.). In this case, the first diode 340 is also turned on, and thus a current flows from the supply voltage $V_{IN'}$ through the first diode 340 to the bootstrap capacitor 370, thereby charging the bootstrap capacitor 370 with the current.

When the switching element 360 is turned on by the switching element drive unit 350, the second diode 380 is turned off, and the voltage of the node between the second diode 380 and the switching element 360 is raised to a voltage proximate to the input voltage $V_{IN}$. Since the bootstrap capacitor 370 is not charged through the first diode 340 when the switching element 360 is in an ON state, the charging state of the bootstrap capacitor 370 is deteriorated because of the leakage current of the bootstrap capacitor 370 when the switching element 360 is continuously kept turned on for a long period, with the result that a problem arises in that the input voltage $V_{IN}$ transfer efficiency of the switching element 360 is deteriorated. In this case, the common charge pump 310 and the current source 330 may be used to compensate for the gate voltage of the switching element 360 and the charging state of the bootstrap capacitor 370.

The current source 330 is connected to the output terminal of the common charge pump 310, provides an output current to the bootstrap capacitor 370 under the control of the control unit 320, and, if necessary, may provide its output current to charge the gate voltage of the switching element 360.

In this case, the current source 330 may selectively output its predetermined output current under the output current ON/OFF control of the control unit 320.

In this case, the current source 330 may be implemented as a linear regulator that is capable of providing a linear output current. The output current value of the current source 330 may be controlled under the control of the control unit 320 such that it is variable.

In this case, the linear regulator included in the current source 330 may include all regulators that are capable of providing a linear output current under the control of the control unit 320.

The control unit 320 is configured to control the output current of the current source 330, and controls the output current of the current source in order to control the charging of the bootstrap capacitor 370 and the gate voltage of the switching element 360. Furthermore, the control unit 320 controls the output current of the current source 330 in order to control the charging of the bootstrap capacitor 370 that controls the gate voltage of the switching element 360.

In this case, the control unit 320 may 1) detect the charging voltage of the bootstrap capacitor 370 regardless of 100% duty cycle mode and control the output current of the current source 330 based on the detected voltage, and may 2) detect whether 100% duty cycle mode is active and control the output current of the current source 330 based on the results of the detection.

1) When the control unit 320 controls the output current of the current source 330 based on the charging voltage of the bootstrap capacitor 370, it is necessary to model the relationship between the charging voltage of the bootstrap capacitor 370 and the output current of the current source 330. That is, the control unit 320 detects the charging voltage of the bootstrap capacitor 370, and controls the current source using a model that may provide a first output current to the bootstrap capacitor 370 if the charging voltage of the bootstrap capacitor 370 is a first voltage that requires the output current of the current source 330 and provide a second output current (second output current>first output current) to the bootstrap capacitor 370 if the charging voltage of the bootstrap capacitor 370 is a second voltage (second voltage<first voltage).

2) When the control unit 320 controls the output current of the current source 330 depending on whether 100% duty cycle mode is active, the control unit 320 detects whether 100% duty cycle mode is active, and, if it is determined that the switching mode converter is in 100% duty cycle mode, controls the output current of the current source 370 so that the output current of the current source 330 is continuously provided to the bootstrap capacitor 370. That is, the control unit 320 controls the current source 330 only in 100% duty cycle mode, so that the output current of the current source 330 is continuously provided to the bootstrap capacitor 370.

In this case, the control unit 320 may detect the PWM ON-time of the switching element drive unit 350, and may detect the switching mode converter being in 100% duty cycle mode if the PWM ON-time is equal to or longer than a specific time (a 1 frequency of PWM reference clock), if the ON-time of the switching element 360 is equal to or longer than a predetermined reference time, if a separate command indicative of 100% duty cycle mode operates, or if the charging voltage of the bootstrap capacitor 370 (the voltage difference between both ends thereof) drops to a value below a predetermined specific voltage.

The switching element 360 is turned selectively on and off by the charging voltage of the bootstrap capacitor 370 charged with the output current of the current source 330 and the supply voltage $V_{IN'}$ and by the PWM control of the switching element drive unit 350, converts the input voltage $V_{IN}$ to out voltage of the switching mode converter, and outputs the converted output voltage.

In this case, when the switching mode converter is in 100% duty cycle mode, the switching element 360 may be continuously turned on, may convert input voltage $V_{IN}$, and may output the converted voltage. The output voltage of the switching element 360 may be decided by the gate voltage and the input voltage $V_{IN}$.

The switching element 360 is connected to the input voltage $V_{IN}$ and the second diode 380.

The second diode 380 is connected to the ground GND and the switch device 260. By using the second diode 380, an asynchronous switching mode converter may be implemented.

It will be apparent that the second diode 380 may be replaced with another switching element (for example, a transistor). By using the switching element, a synchronous switching mode converter may be implemented.

That is, according to the present invention, by forming a first semiconductor device including any one of the diode or other switching element between the ground and the switching element 360, a synchronous or asynchronous switching mode converter may be implemented.

The inductor 390 outputs an output voltage Vout to an output capacitor 410 and an output load resistor 420 using a voltage that is output in response to the turning on or off the switching element 360.

As described above, the switching mode converter according to this embodiment of the present invention controls the charging of the bootstrap capacitor and the gate voltage of the switching element by controlling the ON and OFF states of the output current of the current source connected to the output terminal of the common charge pump or the output level of the output current, thereby providing a stable bootstrap function and also implementing an SoC-enabling switching mode converter.

Furthermore, the switching mode converter according to this embodiment of the present invention prevents the gate voltage of the switching element from being raised to a voltage above a required voltage by controlling the output current level or the ON and OFF states of the output of the current source based on the charging voltage of the bootstrap capacitor, thereby protecting the switching element, with the result that the reliability of the switching mode converter can be improved. Moreover, the switching mode converter according to this embodiment of the present invention does not require additional external capacitors, thereby preventing the cost of products from increasing.

Figure 4:
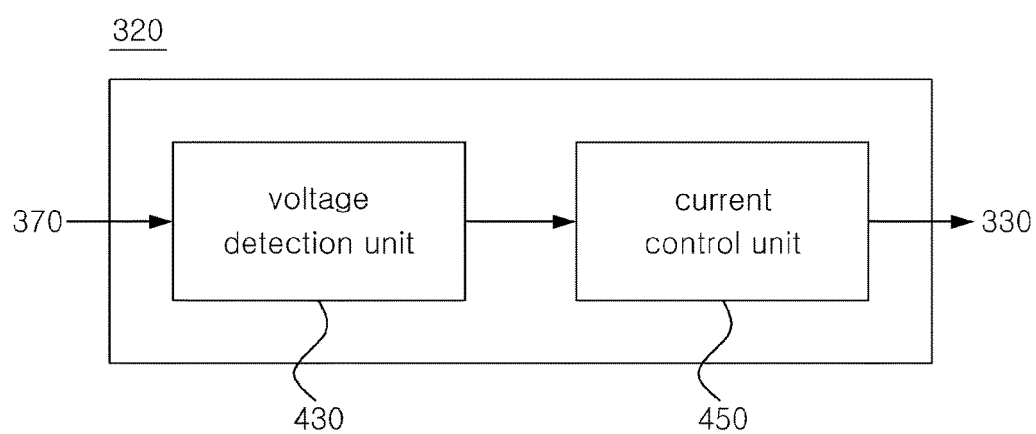
FIG. 4 illustrates the configuration of an embodiment of the control unit illustrated in FIG. 3.

FIG. 4 illustrates the configuration of an embodiment of the control unit illustrated in FIG. 3.

Referring to FIG. 4, the control unit 320 includes a voltage detection unit 430, and a current control unit 450.

The voltage detection unit 430 detects the charging voltage of the bootstrap capacitor in real-time or at specific time intervals.

The current control unit 450 controls the output current ON and OFF or output current level of the current source based on the charging voltage of the bootstrap capacitor that is detected by the voltage detection unit 430.

That is, FIG. 4 illustrates the operation 1) of the control unit 320 in the above description of the operation of the control unit 320 of FIG. 3.

Figure 5:
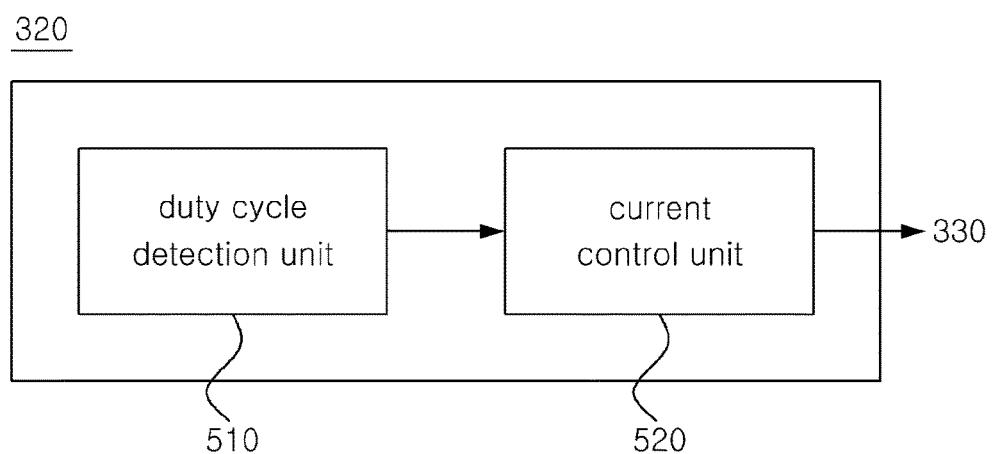
FIG. 5 illustrates the configuration of another embodiment of the control unit illustrated in FIG. 3.

FIG. 5 illustrates the configuration of another embodiment of the control unit illustrated in FIG. 3.

Referring to FIG. 5, the control unit 320 includes a duty cycle detection unit 510, and a current control unit 520.

The duty cycle detection unit 510 detects whether the switching mode converter is in 100% duty cycle mode.

In this case, the duty cycle detection unit 510 may detect the switching mode converter being in 100% duty cycle mode if the PWM ON-time is equal to or longer than a specific time (a 1 frequency of PWM reference clock), if the ON-time of the switching element 360 is equal to or longer than a predetermined reference time, if a separate command indicative of 100% duty cycle mode operates, or if the charging voltage of the bootstrap capacitor (the voltage difference between both ends thereof) drops to a value below a predetermined specific voltage.

If the switching mode converter being in 100% duty cycle mode is detected by the duty cycle detection unit 510, the current control unit 520 controls the output current of the current source so that the output current of the current source is continuously provided to the bootstrap capacitor.

That is, FIG. 5 illustrates the operation 2) of the control unit 320 in the above description of the operation of the control unit 320 of FIG. 3.

Figure 6:
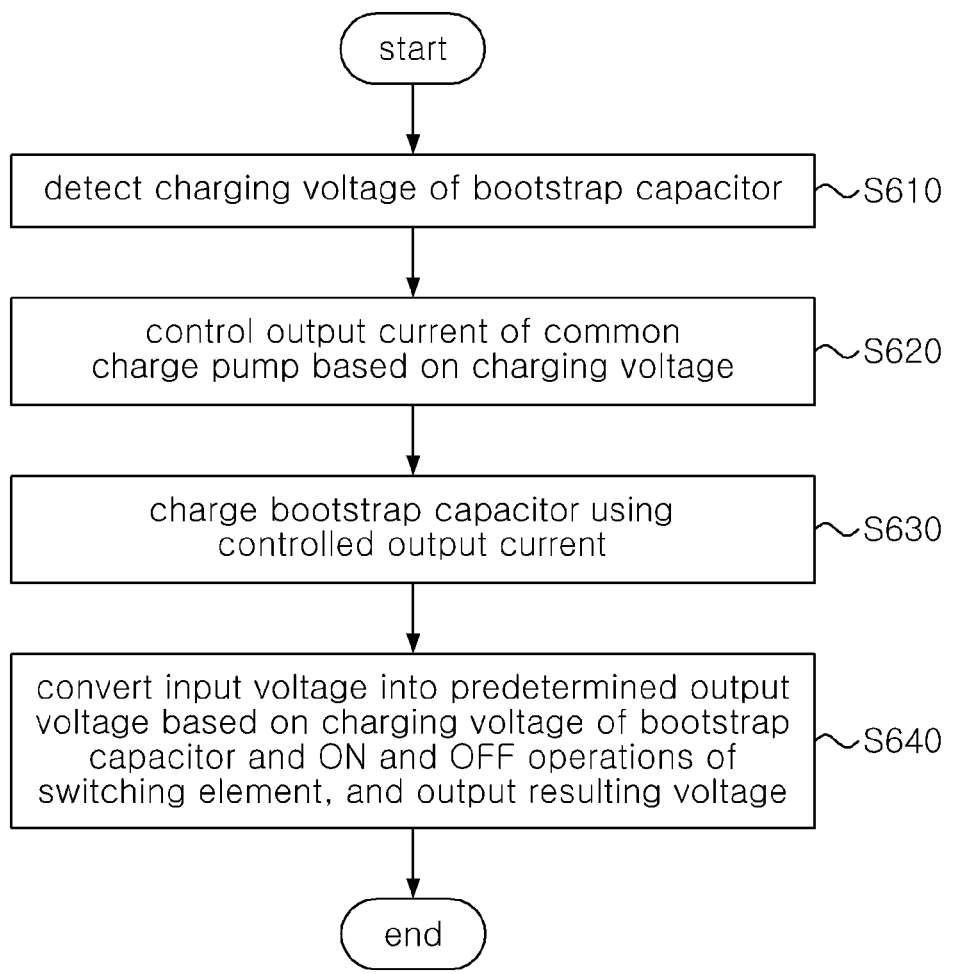
FIG. 6 is an operational flowchart illustrating an embodiment of the operation of the switching mode converter according to the present invention.

FIG. 6 is an operational flowchart illustrating an embodiment of the operation of the switching mode converter according to the present invention.

Referring to FIG. 6, the switching mode converter detects the charging voltage, that is, both end voltage of the bootstrap capacitor at step S610.

The output current that is provided from the common charge pump for providing an additional current to the bootstrap capacitor to the bootstrap capacitor is controlled based on the detected charging voltage of the bootstrap capacitor at step S620.

In this case, the current source is connected to the output terminal of the common charge pump. An additional current provided to the bootstrap capacitor may be controlled by controlling the output current ON and OFF states of the current source or the output current level of the current source.

Once the bootstrap capacitor has been additionally charged using the controlled output current of the current source at step S630, the input voltage is converted into a specific voltage and output using the charging voltage of the bootstrap capacitor and the ON and OFF operation of the switching element at step S640.

In this case, the output voltage of the switching element may be determined by the gate voltage and the input voltage.

That is, an input voltage input to the drain of the switching element 360 is converted into a specific voltage using the charging voltage of the bootstrap capacitor 370 input to the gate of the switching element 360 during the ON and OFF time of the switching element 360 and the switching ON time determined by a PWM control signal, and then output, thereby providing a specific output voltage to the output terminal.

Figure 7:
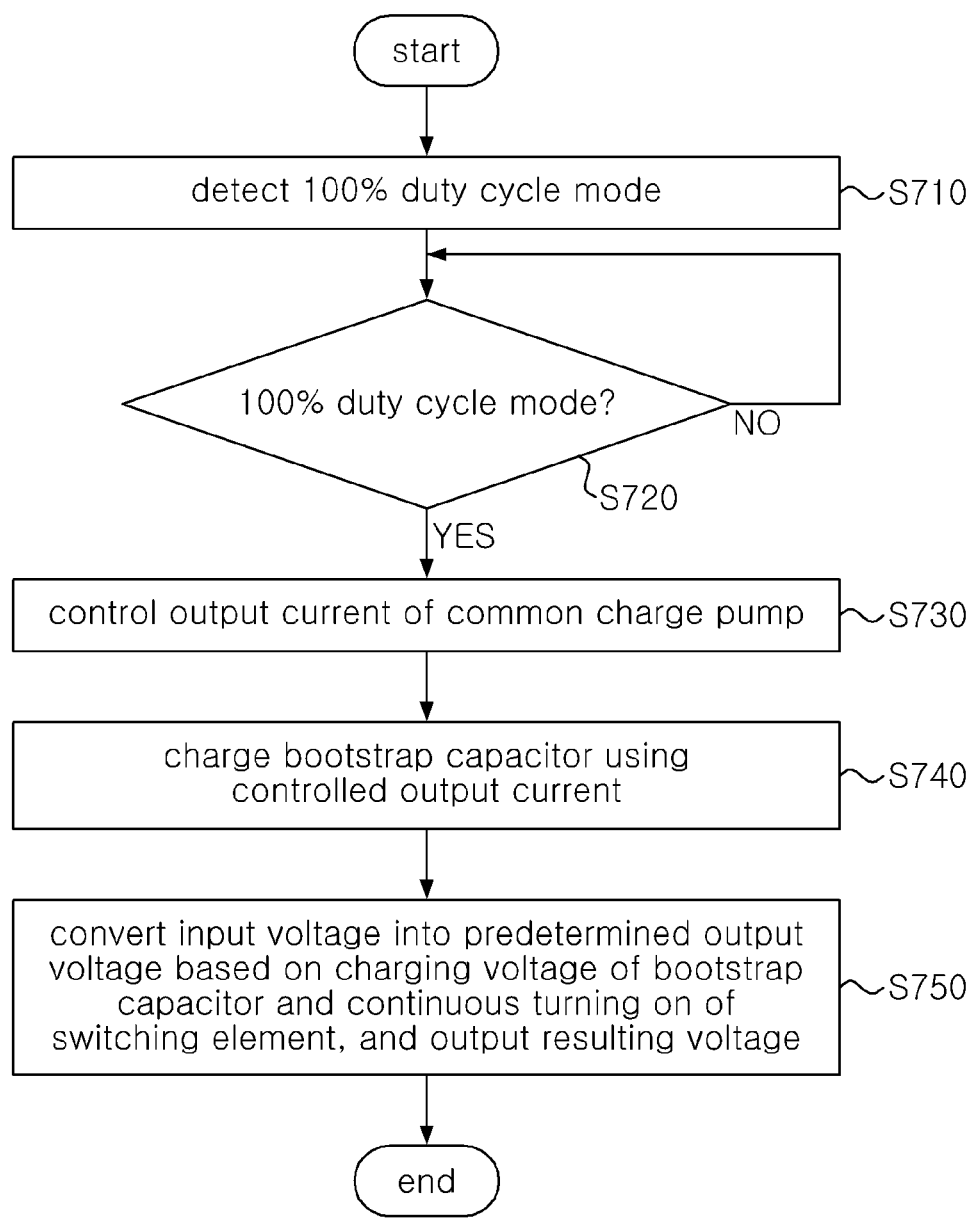
FIG. 7 is an operational flowchart illustrating another embodiment of the operation of the switching mode converter according to the present invention.

FIG. 7 is an operational flowchart illustrating another embodiment of the operation of the switching mode converter according to the present invention. This embodiment is directed to current control based on whether the switching mode converter is in 100% duty cycle mode.

Referring to FIG. 7, it is detected whether the switching mode converter operates in 100% duty cycle mode at step S710, and, if it is determined at step S720 that the switching mode converter operates in 100% duty cycle mode, the output current is continuously provided to the bootstrap capacitor 370 by controlling the output current that is provided from the common charge pump 310 for providing an additional current to the bootstrap capacitor 370 at step S730.

In this case, the current source 330 may be connected to the output terminal of the common charge pump 310, and, if 100% duty cycle mode is detected, a specific output current may be continuously transferred to the bootstrap capacitor 370 by turning on the specific output current of the current source 330, or an output current having a specific level or an output current having a varying level may be continuously transferred to the bootstrap capacitor 370 by controlling the output current level of the current source 330.

Once the bootstrap capacitor 370 has been additionally charged using the output current continuously output from the current source 330 at step S740, the input voltage is converted into a specific voltage and then output using the charging voltage of the bootstrap capacitor 370 and the continuous ON state of the switching element 360 at step S750. In this case, the output voltage of the switching element 360 may be decided by the gate voltage and the input voltage.

That is, since the switching mode converter is in 100% duty cycle mode, the switching element 360 is continuously kept turned on for one or more periods, and the input voltage input to the drain of the switching element 360 is converted into a specific voltage using the charging voltage of the bootstrap capacitor input to the gate of the switching element 360 and then output, thereby providing a specific output voltage to the output terminal.

Figure 8:
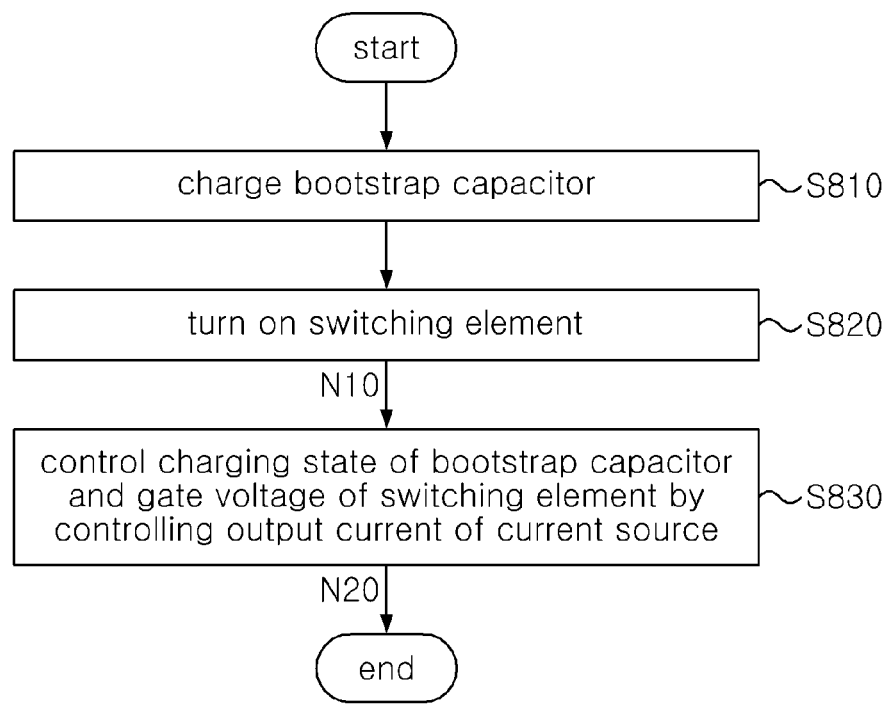
FIG. 8 is an operational flowchart illustrating a method of controlling a switching mode converter according to an embodiment of the present invention.

FIG. 8 is an operational flowchart illustrating a method of controlling a switching mode converter according to an embodiment of the present invention.

Referring to FIG. 8, in the method of controlling a switching mode converter, the bootstrap capacitor connected to one side of a first semiconductor device 380, for example, a diode or a transistor, the other side of which is connected to the ground is charged at step S810.

In this case, the bootstrap capacitor 370 may be charged in the state in which input power and the switching element 360, which is connected to the one side of the first semiconductor device 380, have been turned off.

Once the bootstrap capacitor 370 has been charged, the input power and the switching element 360, which is connected to the one side of the first semiconductor device 380, are turned on at step S820, and the output current of the current source 330 is controlled to control the charging state of the bootstrap capacitor 370 and the gate voltage of the switching element 360 at step S830.

In this case, the current source 330 may be connected between the output terminal of the common charge pump 310 and the other side of the bootstrap capacitor 370.

Figure 9:
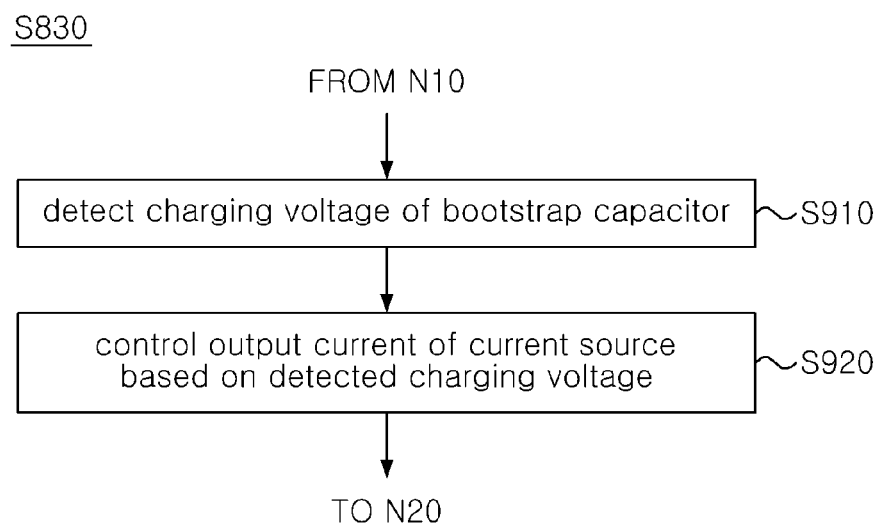
FIG. 9 is an operational flowchart illustrating an embodiment of step S830 illustrated in FIG. 8.
Figure 10:
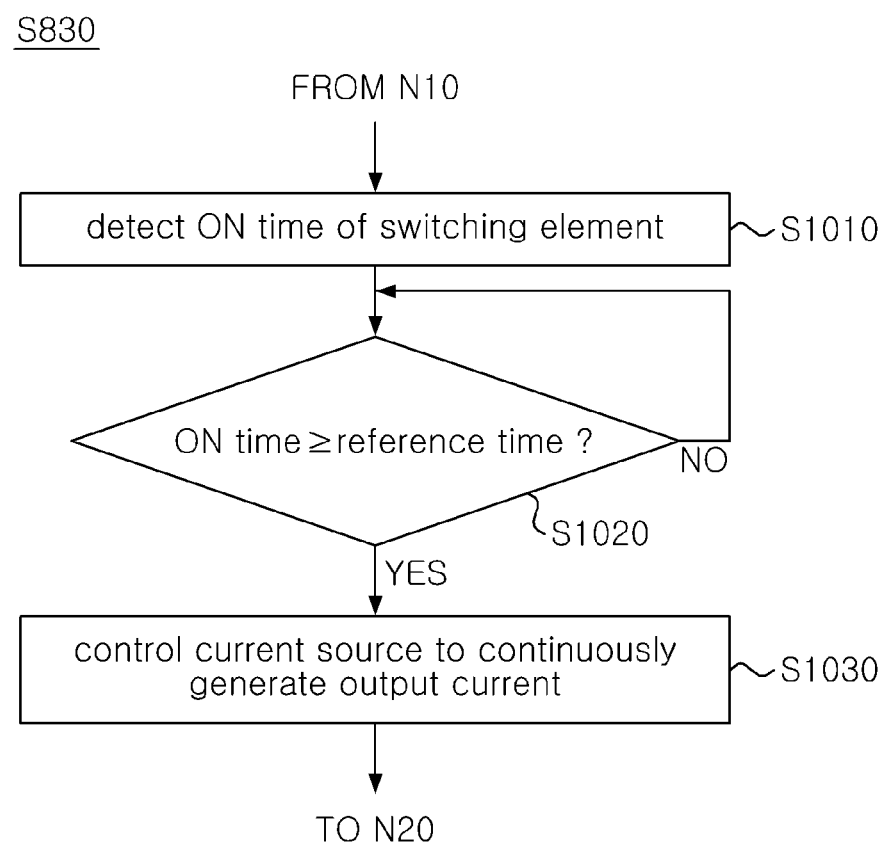
FIG. 10 is an operational flowchart illustrating another embodiment of step S830 illustrated in FIG. 8.

The output current of the current source 330 at step S830 may be controlled based on the bootstrap charging voltage and whether the switching mode converter is in 100% duty cycle mode, as illustrated in FIGS. 9 and 10.

That is, as in the example illustrated in FIG. 9, step S830 of controlling the output current of the current source 330 includes detecting the charging voltage of the bootstrap capacitor 370 at step S910 and controlling the output current of the current source 330 based on the detected charging voltage of the bootstrap capacitor 370 at step S920.

In this case, according to the present invention, the output current of the current source 330 may be turned on and off and the level of the output current may be controlled, based on the charging voltage of the bootstrap capacitor 370.

Furthermore, as in another example illustrated in FIG. 10, in order to determine whether the switching mode converter is in 100% duty cycle mode, the ON-time of the switching element 360 is detected at step S1010, and whether the switching mode converter is in 100% duty cycle mode is determined by comparing the ON-time of the detected switching element 360 with a predetermined reference time at step S1020.

In this case, although whether the switching mode converter is in 100% duty cycle mode is described as being determined using the ON-time of the switching element 360, the present invention is not limited thereto, and various criteria may be used to determine whether the switching mode converter is in 100% duty cycle mode.

If, as a result of the determination at step S1020, it is determined that the ON-time of the switching element 360 is equal to or longer than the reference time, the output of the current source 330 is controlled such that the output current of the current source 330 is continuously output at step S1030.

In this case, the operations of FIG. 6 through FIG. 10 may be controlled by a control circuit including the control unit 320 and the switching element drive unit 350.

Figure 11:
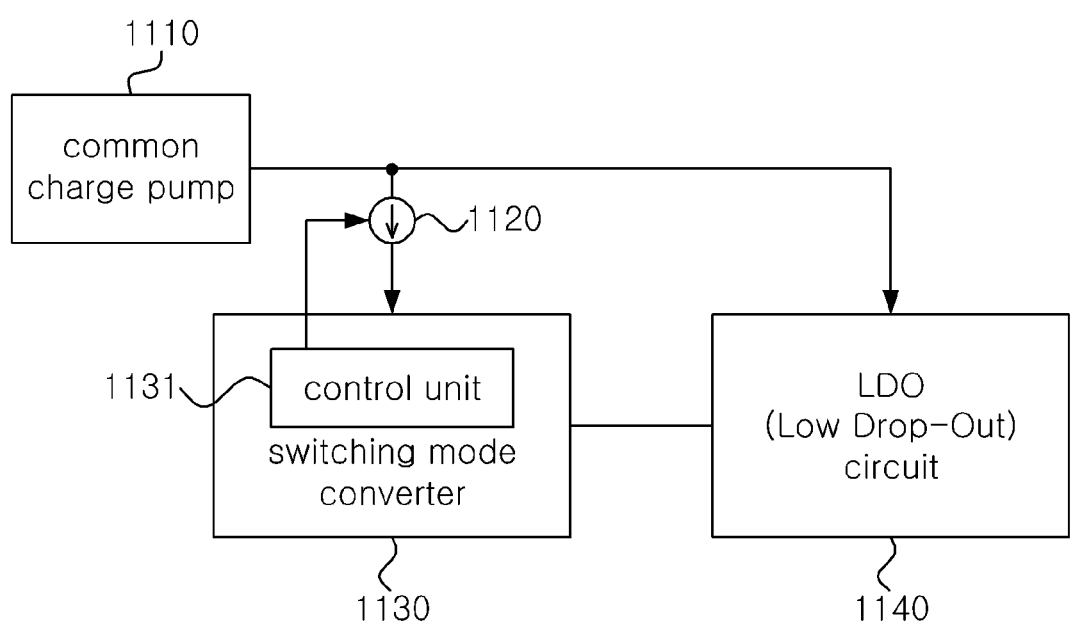
FIG. 11 illustrates the configuration of an SoC-enabling power circuit according to an embodiment of the present invention.

FIG. 11 illustrates the configuration of an SoC-enabling power circuit according to an embodiment of the present invention.

Referring to FIG. 11, the power circuit includes a switching mode converter 1130 including a common charge pump 1110, a current source 1120, and a control unit 1131, and an LDO (Low Drop-Out) circuit 1140. The common charge pump 1110 provides additional charges to the switching mode converter 1130 and the LDO circuit 1140.

That is, this embodiment is advantageous in that the implementation of an SoC is easily facilitated by the use of the common charge pump 1110 and a required space can be reduced by the use of the single common charge pump 1110.

The current source 1120 is connected to the output terminal of the common charge pump 1110, receives the output voltage of the common charge pump 1110, and provides the output current to the switching mode converter 1130 under the control of the control unit 1131.

The switching mode converter 1130 is connected to the output terminal of the current source 1120, converts the voltage of the input power into a predetermined level of first output voltage, and provides the converted first output voltage to the LDO circuit 1140.

The control unit 1131 included in the switching mode converter 1130 controls the output current of the current source 1120 in order to control the charging state of the bootstrap capacitor and the gate voltage of the switching element inside the switching mode converter 1130.

In this case, the control unit 1131 may detect the charging voltage of the bootstrap capacitor, may control the output current of the current source 1120 based on the detected charging voltage, and, if the detected charging voltage is equal to or lower than a predetermined threshold voltage, may control the current source 1120 so that the output current of the current source 1120 can be continuously output to the bootstrap capacitor and the gate terminal switching element.

Furthermore, the control unit 1131 may detect the ON-time of the switching element inside the switching mode converter 1130, and, if the detected ON-time is equal to or longer than a predetermined reference time, may control the current source 1120 so that the output current of the current source 1120 is continuously output to the bootstrap capacitor and the gate terminal of the switching element.

The current source 1120 and the switching mode converter 1130 illustrated in FIG. 11 may include all the functions that are illustrated in FIGS. 3 to 5.

The LDO circuit 1140 converts the first output voltage of the switching mode converter 1130 into a second output voltage, transfers the second output voltage to a load, is connected to the output terminal of the common charge pump 1110, and uses the high-electric potential voltage of the common charge pump 1110.

In this case, the LDO circuit 1140 may use the high-electric potential voltage of the common charge pump when a pass element (not illustrated) uses an n-type transistor.

As described above, in the power circuit illustrated in FIG. 11, the output of the common charge pump 1110 may be connected both to the switching mode converter 1130 and to the LDO circuit 1140, the high-electric potential voltage of the common charge pump 1110 may be adjusted to the target voltage of the LDO circuit 1140 or other high-electric potential driver, and the charging state of the bootstrap capacitor may be controlled by controlling the output current level of the current source 1120 in 100% duty cycle mode or the like.

Figure 12:
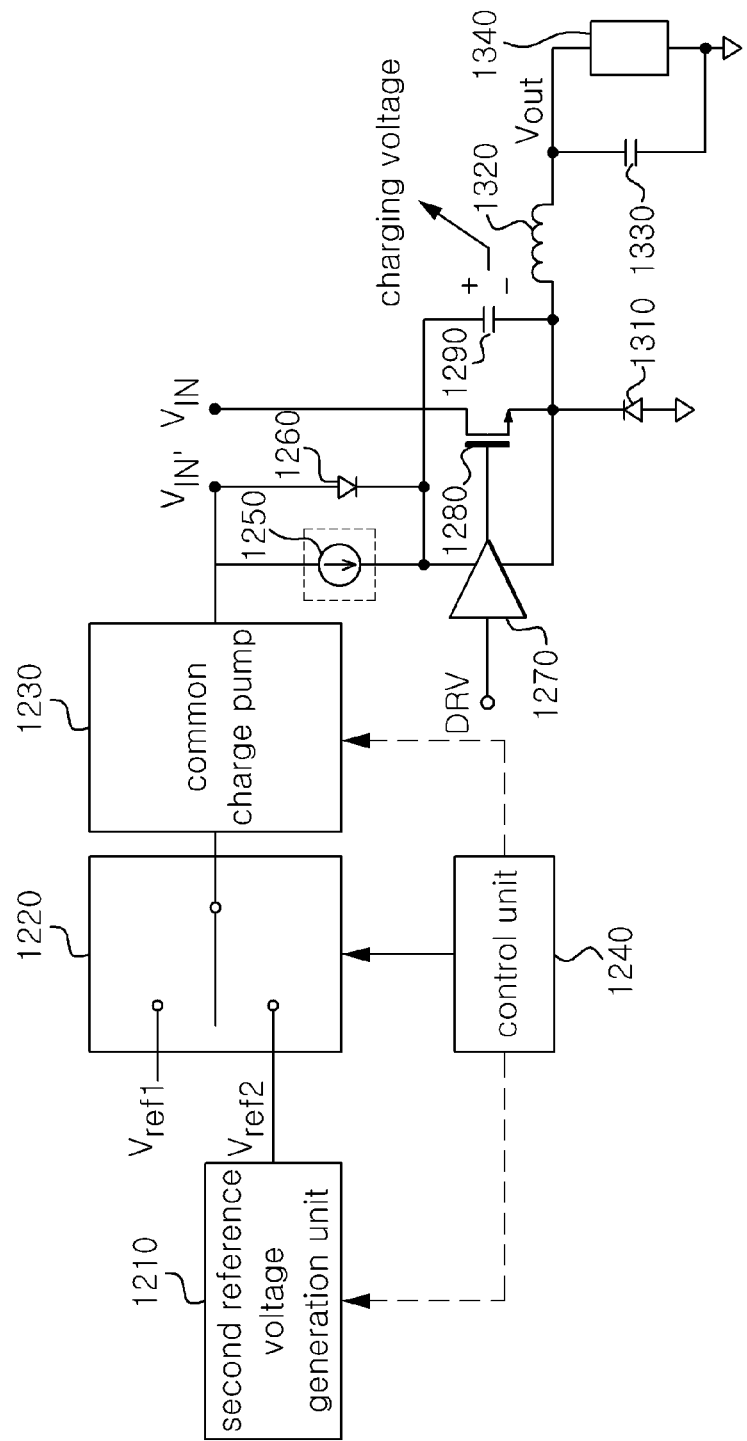
FIG. 12 illustrates the configuration of a switching mode converter according to another embodiment of the present invention.

FIG. 12 illustrates the configuration of a switching mode converter according to another embodiment of the present invention. This drawing illustrates the configuration of an asynchronous switching mode converter.

Referring to FIG. 12, the switching mode converter according to this embodiment of the present invention includes a second reference voltage generation unit 1210, a reference voltage selection unit 1220, a common charge pump 1230, a control unit 1240, a current source 1250, a first diode 1260, a switching element drive unit 1270, a switching element 1280, a bootstrap capacitor 1290, a second diode 1310, and an inductor 1320.

The common charge pump 1230 is a charge pump that supplies charges not only to the switching mode converter of this embodiment but also to other components that require additional charges, such as a low dropout (LDO) regulator. That is, the common charge pump 1230 is a charge pump that is used in common by components that require the charge pump in an IC chip or in a product, for example, a controller of vehicle or automotive.

The common charge pump 1230 receives a reference voltage, for example, a first reference voltage Vref1 or a second reference voltage Vref2, from the reference voltage selection unit 1220, outputs an output voltage generated using the input reference voltage to the current source 1250 through the output terminal.

In this case, if there is no current source 1250, the output voltage of the common charge pump 1230 may be directly input to the bootstrap capacitor 1290 and the switching element drive unit 1270.

In this case, since the reference voltage input to the common charge pump 1230 may be variable, the output voltage may also be variable. This embodiment is advantageous in that 100% duty cycle mode may be implemented by controlling the input of the reference voltage capable of determining the output voltage level of the common charge pump 1230 and in that the switching mode converter included in an SoC may be implemented because the common charge pump 1230 is used.

The current source 1250 is connected to the output terminal of the common charge pump 1230, provides a specific output current to the bootstrap capacitor 1290 and, if necessary, may provide its output current to charge the gate voltage of the switching element 1280.

In this case, if necessary, the current source 1250 may output or may not output the output current by the setting of ON and OFF states following the control of the control unit 1240.

The current source 1250 may be implemented as an LDO regulator or a series element.

The bootstrap capacitor 1290 is connected to a node between the second diode 1310 and the switching element 1280 and the output terminal of the current source 1250, receives a predetermined supply voltage $V_{IN'}$ through the first diode 1260, and is charged with a voltage using the supply voltage $V_{IN'}$ and, if necessary, an output current output from the current source 1250. The charged voltage is applied as the gate voltage of the switching element 1280 by the ON and OFF control of the switching element drive unit 1270.

In this case, the bootstrap capacitor 1290 may receive a voltage $V_{IN'}$ different from the input voltage $V_{IN}$ input to the drain of the switching element 1280 through the first diode 1260. The supply voltage $V_{IN'}$ may be a voltage generated using the input voltage $V_{IN}$, or may be a voltage generated using a separate voltage. Although the supply voltage $V_{IN'}$ and the input voltage $V_{IN}$ have been described as being different voltages, this embodiment is not limited thereto, and the input voltage $V_{IN}$ may be used as the supply voltage $V_{IN'}$.

In this case, the input voltage $V_{IN}$ input to the drain of the switching element 1280 may be a voltage output directly from a product, for example, the battery of a vehicle or automotive, or may be a voltage input through a specific circuit formed between the battery of the vehicle or automotive and the switching mode converter of this embodiment.

The switching element drive unit 1270 inputs the charging voltage of the bootstrap capacitor 1290 to the gate of the switching element 1280 through control using a switching element drive signal, for example, a PWM signal DRV.

When the switching element 1280 is turned off by the switching element drive unit 1270, the second diode 1310 is turned on and the voltage of a node between the second diode 1310 and the switching element 1280 is lowered to a voltage approximate to 0, in accordance with the operating characteristics of the buck topology (the arrangement of the inductor 1320 and the capacitor 1330) of the switching mode converter. In this case, the first diode 1260 is also turned on, and thus a current flows from the supply voltage $V_{IN'}$ through the first diode 1260 to the bootstrap capacitor 1260, thereby charging the bootstrap capacitor 1290 with the current.

When the switching element 1280 is turned on by the switching element drive unit 1270, the second diode 1310 is turned off, and the voltage of the node between the second diode 1310 and the switching element 1280 is raised to a voltage proximate to the input voltage $V_{IN}$. Since the bootstrap capacitor 1290 is not charged through the first diode 1260 when the switching element 1280 is in an ON state, the charging state of the bootstrap capacitor 1290 is deteriorated because of the leakage current of the bootstrap capacitor 1290 when the switching element 1280 is continuously kept turned on for a long period, with the result that a problem arises in that the input voltage $V_{IN}$ transfer efficiency of the switching element 1280 is deteriorated. In this case, the common charge pump 1230 and the current source 1250 may be used to compensate for the gate voltage of the switching element 1280 and the charging state of the bootstrap capacitor 1290.

The second reference voltage generation unit 1210 generates a second reference voltage used to be input as the reference voltage of the common charge pump 1230 when the switching element 1280 is in 100% duty cycle mode.

In this case, although the second reference voltage generation unit 1210 may generate a second reference voltage having a preset voltage level, this embodiment is not limited thereto, and the second reference voltage generation unit 1210 may generate a second reference voltage having a voltage level varying under the control of the control unit 1240, as illustrated.

The reference voltage selection unit 1220 receives the first reference voltage and the second reference voltage, selects one reference voltage from among the input first reference voltage and the second reference voltage under the control of the control unit 1240, and inputs the selected reference voltage to the common charge pump 1230.

In this case, the first reference voltage may be a reference voltage that is used in general mode (or basic mode) other than 100% duty cycle mode, and the second reference voltage may be a reference voltage that is used in 100% duty cycle mode. That is, the reference voltage selection unit 1220 basically inputs the first reference voltage to the common charge pump 1230. When the switching element 1280 operates in 100% duty cycle mode, the reference voltage selection unit 1220 converts the first reference voltage into the second reference voltage, and inputs the second reference voltage to the common charge pump 1230.

The control unit 1240 detects whether the switching element 1280 operates in 100% duty cycle mode, and controls the reference voltage selection unit 1220 so that one of the first and second reference voltages is input to the common charge pump 1230 depending on whether the switching element 1280 operates in 100% duty cycle mode. The control unit 1240 determines one of the first and second reference voltages is input to the common charge pump 1230 depending on whether the switching element 1280 operates in 100% duty cycle mode.

That is, the control unit 1240 controls the input of the reference voltage intended to control the output voltage level of the common charge pump 1230 in order to control the charging of the bootstrap capacitor 1290 and the gate voltage of the switching element 1280 depending on general mode or 100% duty cycle mode.

In this case, the control unit 1240 may detect the PWM ON-time of the switching element drive unit 1270, and may detect the switching mode converter being in 100% duty cycle mode if the PWM ON-time is equal to or longer than a specific time (a 1 frequency of PWM reference clock), if the ON-time of the switching element 1280 is equal to or longer than a predetermined reference time, if a separate command indicative of 100% duty cycle mode operates, or if the charging voltage of the bootstrap capacitor 1290 (the voltage difference between both ends thereof) drops to a value below a predetermined specific voltage.

Furthermore, the control unit 1240 may control that the second reference voltage having an adjusted voltage level can be forwarded to the reference voltage selection unit 1220 by detecting the voltage level of the input power $V_{IN}$ input to the switching element 1280 and then adjusting the voltage level of the second reference voltage while taking into account the detected voltage level. The control unit 1240 may control that the second reference voltage having an adjusted voltage level can be forwarded to the reference voltage selection unit 1220 by detecting the output voltage Vout of the converter and then adjusting the voltage level of the second reference voltage while taking into account the detected voltage level. Moreover, the control unit 1240 may control the voltage level of the second reference voltage while taking into account both the voltage level of the input power $V_{IN}$ and the output voltage Vout of the converter, depending on the situations.

In this case, the control unit 1240 may adjust the voltage level of the second reference voltage based on the range of voltage levels of the input power $V_{IN}$ or the range of output voltage levels of the converter, or may adjust the voltage level of the second reference voltage based on the voltage level of the input power $V_{IN}$ or the output voltage level of the converter using a predetermined second reference voltage generation model.

If necessary, the control unit 1240 may control the ON and OFF states of the output current of the current source 1250, or may control the ON and OFF states of the output itself of the common charge pump 1230.

As described above, the control unit 1240 may selectively control the reference voltage input to the common charge pump 1230 depending on whether the switching mode converter operates in 100% duty cycle, thereby varying the output voltage or output current of the common charge pump 1230 that is provided to the bootstrap capacitor 1290. Furthermore, in the case of 100% duty cycle mode, the control unit 1240 may control the common charge pump 1230 to continuously provide the output current to the bootstrap capacitor 1290.

The switching element 1280 is turned on and off by the charging voltage of the bootstrap capacitor 1290 charged with the output voltage of the common charge pump 1230 and the supply voltage $V_{IN}$, and by the PWM control of the switching element drive unit 1270, converts the input voltage $V_{IN}$ into the output voltage of the switching mode converter, the output voltage has a predetermined level, and outputs the converted output voltage.

In this case, when the switching mode converter operates in 100% duty cycle mode, the switching element 1280 may be kept continuously turned on, may convert the input voltage $V_{IN}$, and may thus output the converted voltage. The output voltage of the switching element 1280 may be decided by the gate voltage and the input voltage $V_{IN}$.

The switching element 1280 is connected to the input voltage $V_{IN}$ and the second diode 1310.

The second diode 1310 is connected to the ground GND and the switch device 1280. By using the second diode 1310, an asynchronous switching mode converter may be implemented.

It will be apparent that the second diode 1310 may be replaced with another switching element (for example, a transistor). By using the switching element, a synchronous switching mode converter may be implemented.

That is, according to the present invention, by forming a first semiconductor device including any one of the diode or other switching element between the ground and the switching element 1280, a synchronous or asynchronous switching mode converter may be implemented.

The inductor 1320 outputs an output voltage Vout to an output capacitor 1330 and an output load resistor 1340 using a voltage that is output in response to the turning on or off of the switching element 1280.

As described above, the switching mode converter according to this embodiment of the present invention controls the charging of the bootstrap capacitor and the gate voltage of the switching element by controlling the output voltage level of the common charge pump in a varying manner, thereby providing stable 100% duty cycle mode. Furthermore, the switching mode converter according to this embodiment of the present invention does not require additional external capacitors, thereby preventing the cost of products from increasing.

Furthermore, the switching mode converter according to this embodiment of the present invention uses the common charge pump, thereby implementing a switching mode converter included an SoC. Moreover, the switching mode converter according to this embodiment of the present invention prevents the gate voltage of the switching element from being raised to a voltage above a required voltage by controlling the reference voltage selected in the case of 100% duty cycle mode while taking into account the drain input voltage of the switching element or the output voltage of the converter, thereby protecting the switching element, with the result that the reliability of the switching mode converter can be improved.

Figure 13:
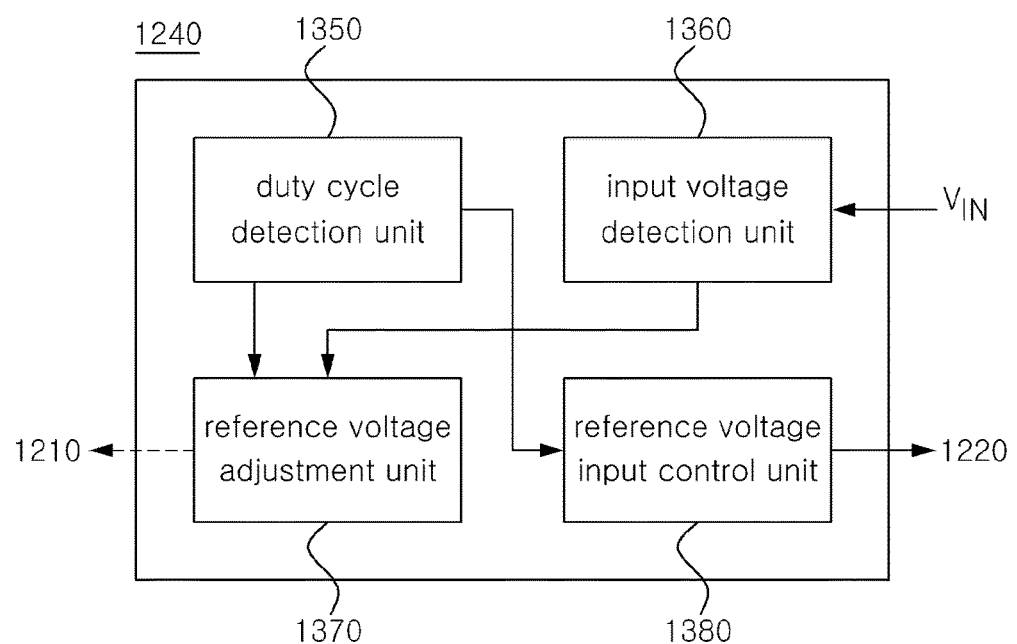
FIG. 13 illustrates the configuration of an embodiment of the control unit illustrated in FIG. 12.

FIG. 13 illustrates the configuration of an embodiment of the control unit illustrated in FIG. 12.

Referring to FIG. 13, the control unit 1240 includes a duty cycle detection unit 1350, an input voltage detection unit

1360, a reference voltage adjustment unit 1370, and a reference voltage input control unit 1380.

The duty cycle detection unit 1350 detects whether the switching mode converter operates in 100% duty cycle mode.

In this case, the duty cycle detection unit 1350 may detect the PWM ON-time of the switching element drive unit, and may detect the switching mode converter being in 100% duty cycle mode if the PWM ON-time is equal to or longer than a specific time (a 1 frequency of PWM reference clock), if the ON-time of the switching element is equal to or longer than a predetermined reference time, if a separate command indicative of 100% duty cycle mode operates, or if the charging voltage of the bootstrap capacitor (the voltage difference between both ends thereof) drops to a value below a predetermined specific voltage.

The input voltage detection unit 1360 detects the level of the input voltage input to the drain of the switching element.

The reference voltage adjustment unit 1370 adjusts the level of the second reference voltage generated by the second reference voltage generation unit 1210 while taking into account the level of the input voltage detected by the input voltage detection unit 1360.

In this case, the reference voltage adjustment unit 1370 may adjust the level of the second reference voltage using a model or a function that determines the level of the second reference voltage in response to the level of the input voltage. Furthermore, the reference voltage adjustment unit 1370 may determine adjustment values for respective level ranges of input voltages previously, and may adjust the level of the second reference voltage using an adjustment value for a level range corresponding to the detected level of the input voltage.

Furthermore, the reference voltage adjustment unit 1370 may adjust the level of the second reference voltage only when 100% duty cycle mode is detected by the duty cycle detection unit 1350, or may adjust the level of the second reference voltage based on the level of the input voltage depending on the situations even in mode other than 100% duty cycle mode.

When 100% duty cycle mode is detected by the duty cycle detection unit 1350, the reference voltage input control unit 1380 controls the reference voltage selection unit 1220 so that the reference voltage input to the common charge pump is changed from the first reference voltage to the second reference voltage and then input.

Figure 14:
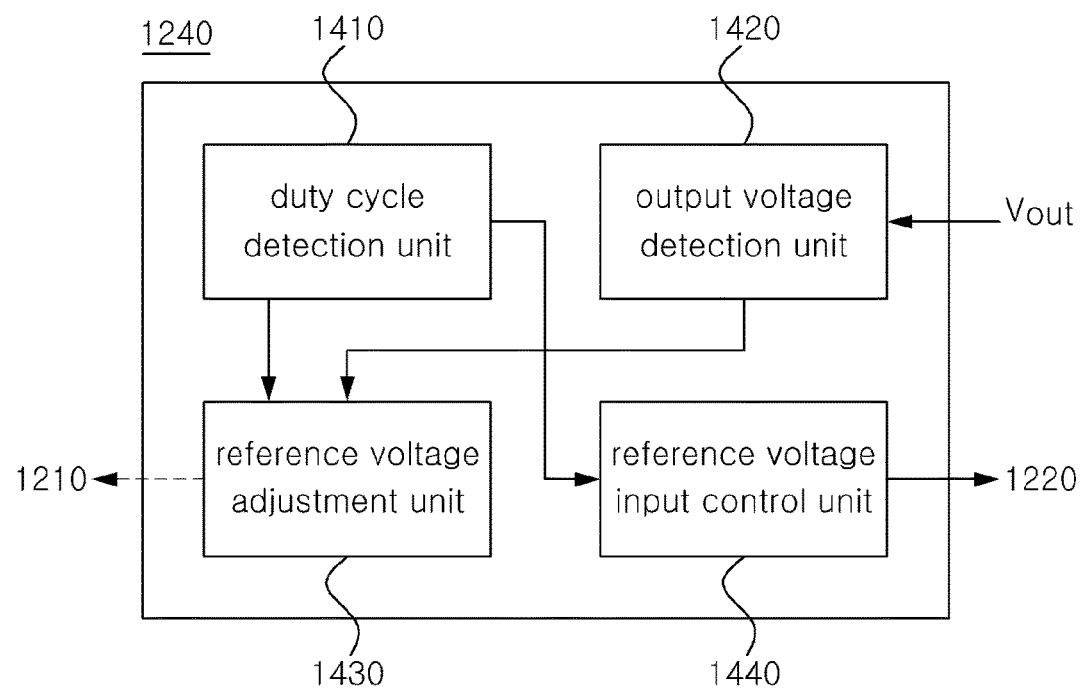
FIG. 14 is the configuration of another embodiment of the control unit illustrated in FIG. 12.

FIG. 14 is the configuration of another embodiment of the control unit illustrated in FIG. 12.

Referring to FIG. 14, the control unit 1240 includes a duty cycle detection unit 1410, an output voltage detection unit 1420, a reference voltage adjustment unit 1430, and a reference voltage input control unit 1440.

The duty cycle detection unit 1410 detects whether the switching mode converter is in 100% duty cycle mode.

In this case, the duty cycle detection unit 1410 may detect the PWM ON-time of the switching element drive unit, and may detect the switching mode converter being in 100% duty cycle mode if the PWM ON-time is equal to or longer than a specific time (a 1 frequency of PWM reference clock), if the ON-time of the switching element is equal to or longer than a predetermined reference time, if a separate command indicative of 100% duty cycle mode operates, or if the charging voltage of the bootstrap capacitor (the voltage difference between both ends thereof) drops to a value below a predetermined specific voltage.

The output voltage detection unit 1420 detects the level of the output voltage of the switching mode converter.

It will be apparent that the detection unit 1420 may detect the output voltage of the switching element.

The reference voltage adjustment unit 1430 adjusts the level of the second reference voltage generated by the second reference voltage generation unit 1210 while taking into account the output voltage level of the switching mode converter detected by the output voltage detection unit 1420.

In this case, the reference voltage adjustment unit 1430 may adjust the level of the second reference voltage using a model or a function that determines the level of the second reference voltage in response to the level of the output voltage. Furthermore, the reference voltage adjustment unit 1430 may determine adjustment values for respective level ranges of output voltages previously, and may adjust the level of the second reference voltage using an adjustment value for a level range corresponding to the detected level of the input voltage.

Furthermore, the reference voltage adjustment unit 1430 may adjust the level of the second reference voltage only when 100% duty cycle mode is detected by the duty cycle detection unit 1410, or may adjust the level of the second reference voltage based on the level of the output voltage depending on the situations even in mode other than 100% duty cycle mode.

When 100% duty cycle mode is detected by the duty cycle detection unit 1410, the reference voltage input control unit 1440 controls the reference voltage selection unit 1220 so that the reference voltage input to the common charge pump is changed from the first reference voltage to the second reference voltage and then input.

Figure 15:
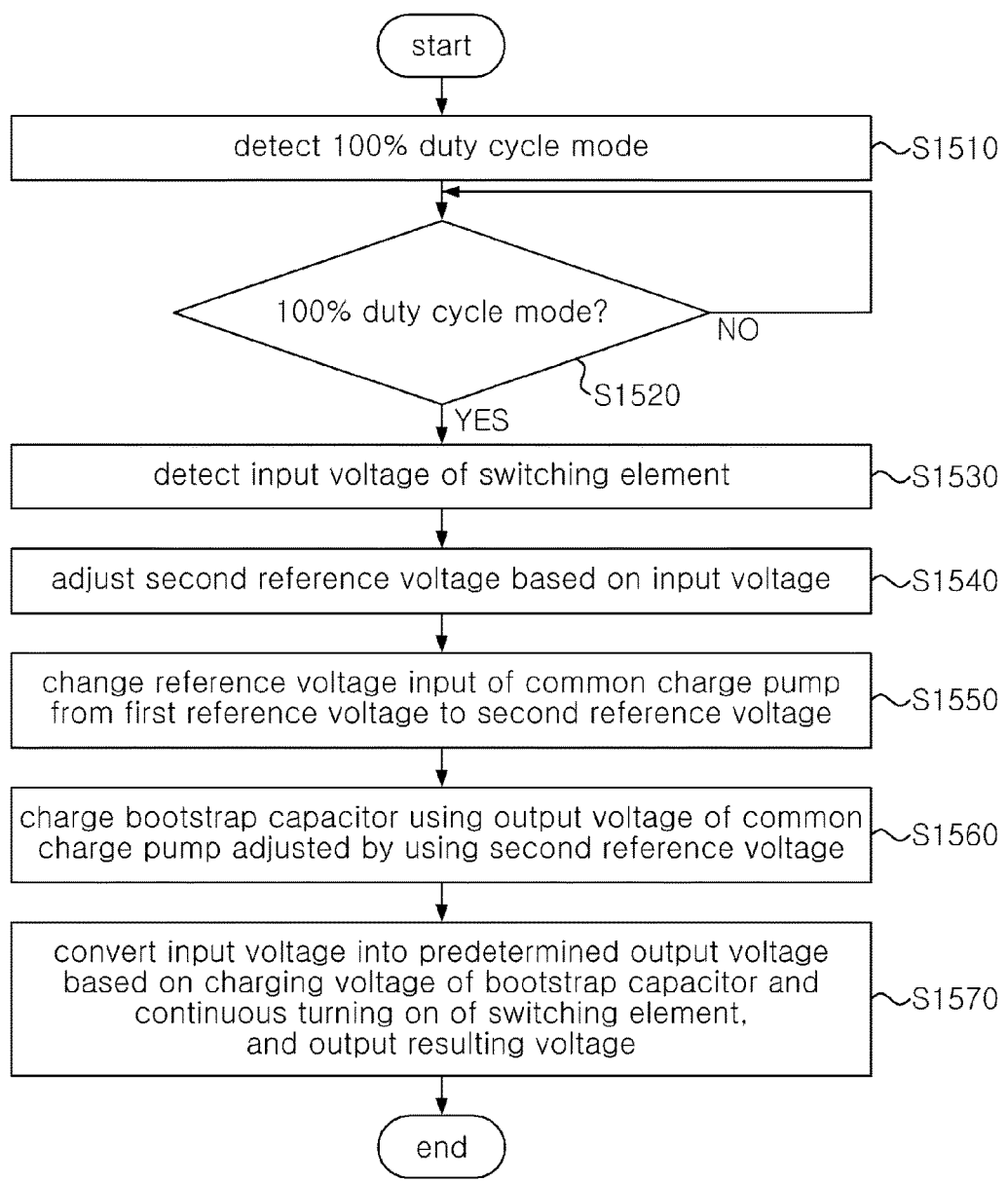
FIG. 15 is an operational flowchart illustrating still another embodiment of the operation of the switching mode converter according to the present invention.

FIG. 15 is an operational flowchart illustrating still another embodiment of the operation of the switching mode converter according to the present invention.

Referring to FIG. 15, the switching mode converter detects whether the switching mode converter is in 100% duty cycle mode at step S1510.

In this case, step S1510 may detect the PWM ON-time of the switching element drive unit, and may detect the switching mode converter being in 100% duty cycle mode if the PWM ON-time is equal to or longer than a specific time (a 1 frequency), if the ON-time of the switching element is equal to or longer than a predetermined reference time, if a separate command indicative of 100% duty cycle mode operates, or if the charging voltage of the bootstrap capacitor (the voltage difference between both ends thereof) drops to a value below a predetermined specific voltage.

If it is determined that the switching mode converter is in 100% duty cycle mode at step S1520, the input voltage $V_{IN}$ input to the drain terminal of the switching element is detected at step S1530.

The switching mode converter adjusts the second reference voltage that is used as the input of the common charge pump in 100% duty cycle mode while taking into account the input voltage input to the switching element at step S1540.

In this case, the second reference voltage may be adjusted to a level corresponding to the detected level of the input voltage using a predetermined model or function, or the like.

Once the second reference voltage has been adjusted, the reference voltage input to the common charge pump is changed from the first reference voltage input in basic mode, that is, in a case other than 100% duty cycle mode, to the second reference voltage and then input at step S1550.

The common charge pump provides the output voltage having an adjusted level using the changed second reference voltage, and continuously provides the adjusted output voltage to the bootstrap capacitor, thereby charging the bootstrap capacitor at step S1560.

Depending on examples, a current source, the output current of which is determined based on the output level of the common charge pump, may be provided at the output terminal of the common charge pump, and the bootstrap capacitor may be charged by continuously providing the output current of the current source to the bootstrap capacitor.

Once the bootstrap capacitor has been additionally charged with the output voltage continuously output from the common charge pump, the input voltage input to the drain of the switching element is converted into a specific voltage using the charging voltage of the bootstrap capacitor and the continuous turning on of the switching element and then output at step S1570.

In this case, the output voltage of the switching element may be decided by the gate voltage and the input voltage.

That is, since the switching mode converter is in 100% duty cycle mode, the switching element is continuously kept turned on for one or more periods, and the input voltage input to the drain of the switching element is converted into a specific voltage using the charging voltage of the bootstrap capacitor input to the gate of the switching element and then output, thereby providing a specific output voltage to the output terminal.

Although the second reference voltage is illustrated as being adjusted while the input voltage of the switching element is being taken into account at steps S1530 and S1540 of FIG. 15, this embodiment is not limited thereto. Alternatively, it may be possible to detect the output voltage of the switching mode converter and then adjust the second reference voltage while taking into account the detected output voltage. Alternatively, it may possible to adjust the second reference voltage while taking into account both the input voltage of the switching element and the output voltage of the switching mode converter.

Furthermore, although steps S1530 and S1540 are described as being performed after step S1520, this embodiment is not limited thereto. Alternatively, steps S1530 and S1540 may be performed in parallel with step S1510. If steps S1530 and S1540 are performed in parallel with step S1510, step S1550 of providing the adjusted reference voltage as the input of the common charge pump is performed if it is determined at step S1520 that the switching mode converter is in 100% duty cycle mode.

Figure 16:
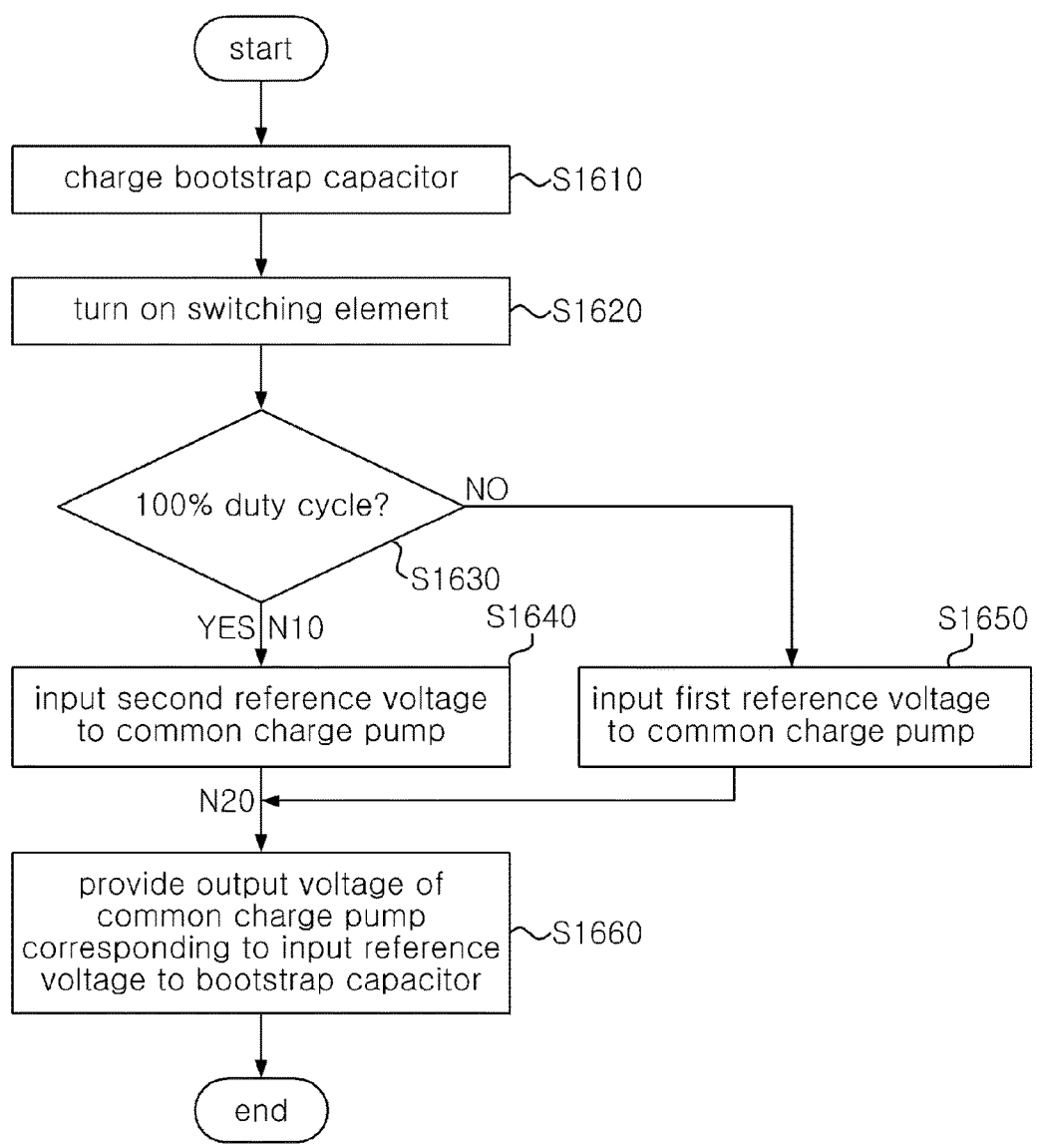
FIG. 16 is an operational flowchart illustrating a method of controlling a switching mode converter according to another embodiment of the present invention.

FIG. 16 is an operational flowchart illustrating a method of controlling a switching mode converter according to another embodiment of the present invention.

Referring to FIG. 16, in the method of controlling a switching mode converter, the bootstrap capacitor connected to one side of a first semiconductor device, for example, a diode or a transistor, the other side of which is connected to the ground is charged at step S1610.

In this case, the bootstrap capacitor may be charged in the state in which the input power and the switching element, which is connected to the one side of the first semiconductor device, have been turned off.

Once the bootstrap capacitor has been charged, the input power and the switching element, which is connected to one side of the first semiconductor device, are turned on at step S1620, and it is determined whether the duty cycle of the switching element is 100% at step S1630.

In this case, step S1630 may detect the PWM ON-time of the switching element drive unit, and may detect the switching mode converter being in 100% duty cycle mode if the PWM ON-time is equal to or longer than a specific time (a 1 frequency), if the ON-time of the switching element is equal to or longer than a predetermined reference time, if a separate command indicative of 100% duty cycle mode operates, or if the charging voltage of the bootstrap capacitor drops to a value below a predetermined specific voltage.

If, as a result of the determination at step S1630, it is determined that the duty cycle of the switching element is a 100% duty cycle, the predetermined second reference voltage is input as the reference voltage of the common charge pump at step S1640. If, as a result of the determination at step S1630, it is determined that the duty cycle of the switching element is not a 100% duty cycle, the predetermined first reference voltage is input as the reference voltage of the common charge pump at step S1650.

The common charge pump receives one of input reference voltages, that is, the first reference voltage and the second reference voltage, and provides an output voltage corresponding to the input reference voltage to the bootstrap capacitor at step S1660.

The level of the second reference voltage at step S1640 may be adjusted. The voltage level of the second reference voltage may be adjusted based on the voltage level of the input power and the output voltage of the switching mode converter, as illustrated in FIGS. 17 and 18.

Figure 17:
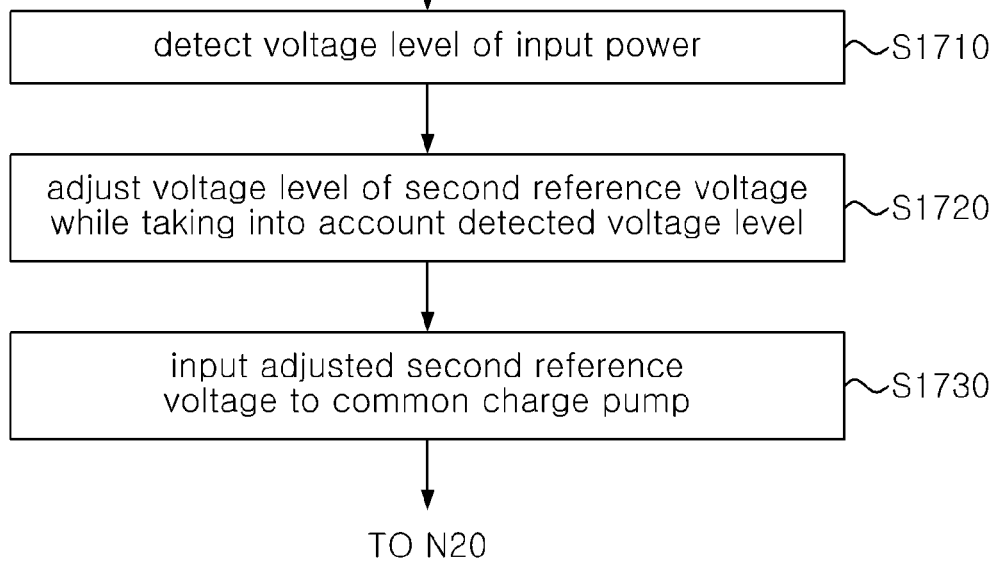
FIG. 17 is an operational flowchart illustrating an embodiment of step S1640 illustrated in FIG. 16.

That is, as in an example illustrated in FIG. 17, the process detects the voltage level of the input power input to the switching element at step S1710, adjusts the voltage level of the second reference voltage while taking into account the detected voltage level of the input power at step S1720, and inputs the second reference voltage having the adjusted voltage level to the common charge pump at step S1730.

Figure 18:
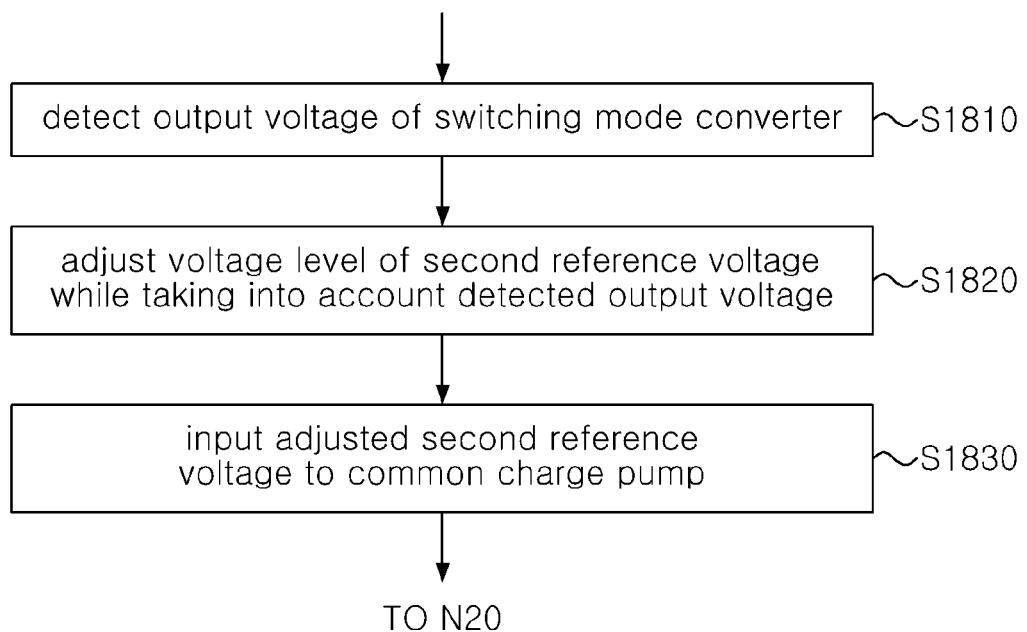
FIG. 18 is an operational flowchart illustrating another embodiment of step S1640 illustrated in FIG. 16.

Furthermore, as in another example illustrated in FIG. 18, the process detects the output voltage based on the topology of a switching mode converter including a switching element, an inductor and a bootstrap capacitor at step S1810, adjusts the voltage level of the second reference voltage while taking into account the detected output voltage at step S1820, and inputs the second reference voltage having the adjusted voltage level to the common charge pump at step S1830.

In this case, the operations of FIG. 15 through FIG. 18 may be controlled by a control circuit including the control unit 1240 and the switching element drive unit 1270.

Figure 19:
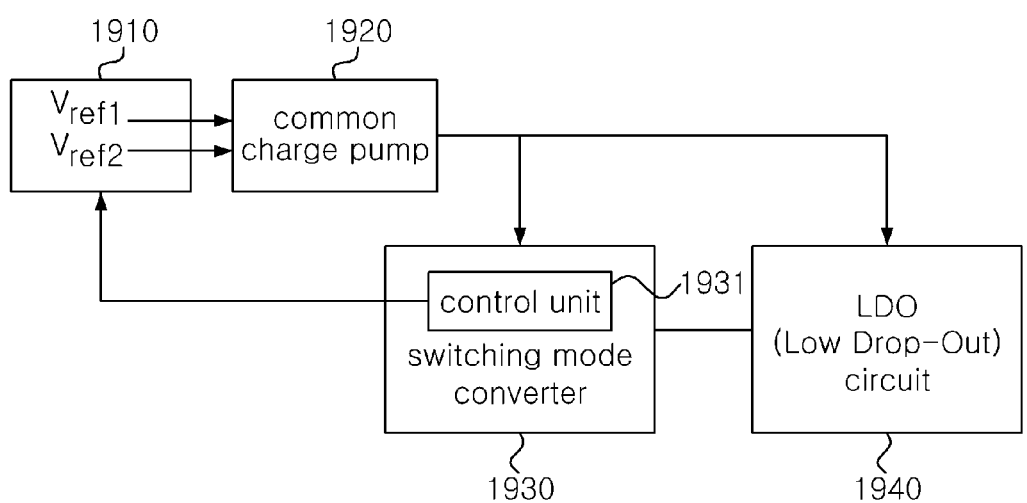
FIG. 19 illustrates the configuration of an SoC-enabling power circuit according to another embodiment of the present invention.

FIG. 19 illustrates the configuration of an SoC-enabling power circuit according to another embodiment of the present invention.

Referring to FIG. 19, the power circuit includes a reference voltage input unit 1910, a common charge pump 1920, a switching mode converter 1930 including a control unit 1931, and an LDO circuit 1940.

The reference voltage input unit 1910 inputs one of first and second reference voltages Vref1 and Vref2 as the reference voltage of the common charge pump 1920 under the control of the control unit 1931 that constitutes part of the switching mode converter 1930.

In this case, the first reference voltage Vref1 may be a reference voltage based on which the common charge pump 1920 provides a high-electric potential voltage to the LDO circuit 940 in the case of a mode other than 100% duty cycle mode. The second reference voltage Vref2 may be a reference voltage based on which the common charge pump 1920 that provides additional charges to at least one of the bootstrap capacitor and the gate terminal of the switching element of the switching mode converter 1930 in accordance with 100% duty cycle mode in the case of 100% duty cycle mode.

Furthermore, the voltage level of the second reference voltage may be adjusted under the control of the control unit 1931.

The common charge pump 1920 is configured to provide additional charges to the switching mode converter 1930, the LDO circuit 1940 and the like. The common charge pump 1920 provides a voltage corresponding to a reference voltage input from the reference voltage input unit 1910 to at least one of the switching mode converter 1930 and the LDO circuit 1940.

As described above, this embodiment is advantageous in that the implementation of a switching mode converter included in an SoC is facilitated and also a required space can be reduced because it does not use a separate charge pump but uses the common charge pump 1920.

The switching mode converter 1930 is connected to the output terminal of the common charge pump 1920, converts the voltage of input power into a predetermined first output voltage, and provides the predetermined first output voltage to the LDO circuit 1940.

The control unit 1931 included in the switching mode converter 1930 determines whether the switching mode converter 1930 is in 100% duty cycle mode, and controls the reference voltage input unit 1910 depending on whether the switching mode converter is in 100% duty cycle mode so that one of the first and second reference voltages Vref1 and Vref2 is input to the common charge pump 1920.

In this case, the control unit may adjust the voltage level of the second reference voltage while taking into account the voltage level of the input power input to the switching element, and may adjust the voltage level of the second reference voltage while taking into account the output voltage of the switching mode converter.

The switching mode converter 1930 illustrated in FIG. 19 may include all the functions illustrated in FIGS. 12 to 14.

The LDO circuit 1940 converts the first output voltage of the switching mode converter 1930 into a second output voltage, transfers the second output voltage to a load, is connected to the output terminal of the common charge pump 1920, and uses the high-electric potential voltage of the common charge pump 1920.

In this case, the LDO circuit 1940 may use the high-electric potential voltage of the common charge pump when a pass element (not illustrated) uses an n-type transistor.

As described above, in the power circuit illustrated in FIG. 19, the output of the common charge pump may be connected both to the switching mode converter and to the LDO circuit. However, if the switching mode converter is not in 100% duty cycle mode, the output of the common charge pump is connected to the LDO circuit or the high-electric potential driver under the control of the control unit included in the switching mode converter, and the high-electric potential voltage of the common charge pump is adjusted to the target voltage of the LDO circuit or high-electric potential driver. In a special condition, such as 100% duty cycle mode, the output of the common charge pump is connected to the switching mode converter, and the high-electric potential voltage output from the common charge pump may be controlled while the input voltage or output voltage of the switching mode converter is being taken into account.

The embodiments of FIGS. 20 to 23 are intended to overcome the problem that charges transferred to the bootstrap capacitor or the gate of the switching element cause an excessive voltage to be applied to the gate of the switching element by a charge pump that is designed to provide a wide margin.

Figure 20:
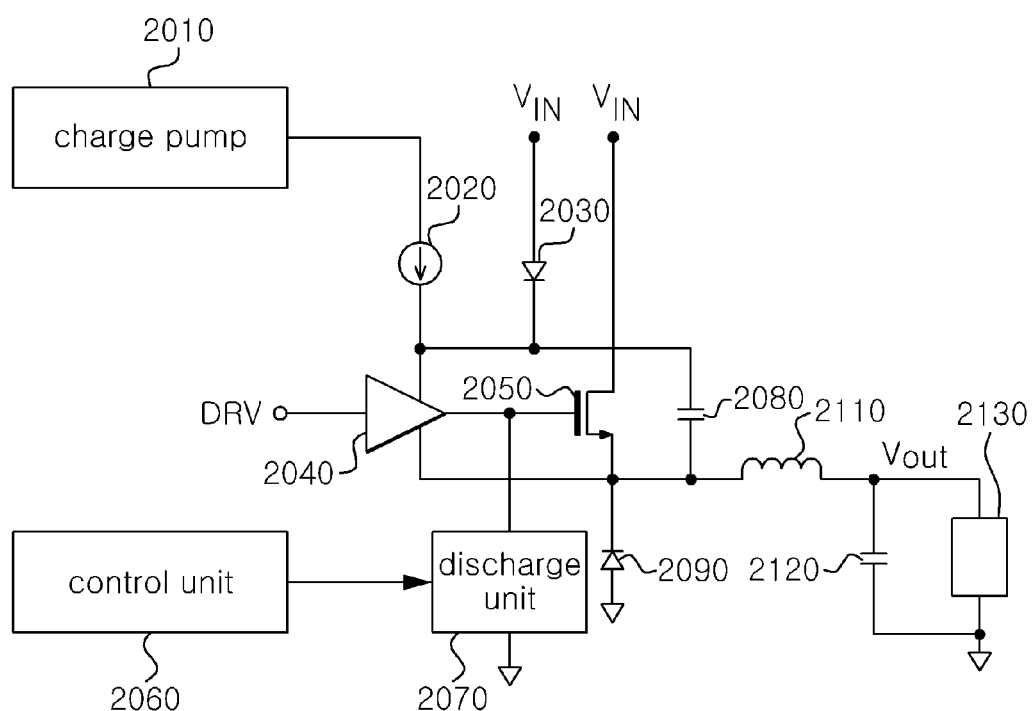
FIG. 20 illustrates the configuration of a switching mode converter according to another embodiment of the present invention.

FIG. 20 illustrates the configuration of a switching mode converter according to another embodiment of the present invention. This drawing illustrates the configuration of an asynchronous switching mode converter.

Referring to FIG. 20, the switching mode converter according to this embodiment of the present invention includes a charge pump 2010, a current source 2020, a first diode 2030, a switching element drive unit 2040, a switching element 2050, a control unit 2060, a discharge unit 2070, a bootstrap capacitor 2080, a second diode 2090, and an inductor 2110.

The charge pump 2010 is configured to provide additional charges to the bootstrap capacitor 2080 or the gate terminal of the switching element 2050. Preferably, the charge pump 2010 functions to supply additional charges to the bootstrap capacitor.

In this case, the charge pump 2010 may be a common charge pump that is used in common in various products, such as an LDO regulator as well as the switching mode converter of the present invention. The common charge pump may be used in a controller of vehicle or automotive and the like.

The output terminal of the charge pump 2010 is connected to the input terminal of the current source 2020. When there is no current source 2020 as needed, the output voltage of the charge pump 2010 may be directly input to the bootstrap capacitor 2080 and the switching element drive unit 2040.

In the present invention, when a charge pump is used as the common charge pump, the switching mode converter according to the present invention may be implemented as an SoC.

The current source 2020 is connected to the output terminal of the charge pump 2030, provides a specific output current to the bootstrap capacitor 2080, and, if necessary, provides the output current as the gate voltage of the switching element 2050.

In this case, the current source 2020 may or may not output the output current provided by the current source 2020 through the ON and OFF control of the output current by the control unit 2060, if necessary.

The bootstrap capacitor 2080 is connected to a node between the second diode 2090 and the switching element 2050 and to the output terminal of the current source 2020, receives a predetermined supply voltage $V_{IN'}$ through the first diode 2030, charges itself using the supply voltage $V_{IN'}$ and, if necessary, a current output from the current source 2020, and applies the charged voltage as the gate voltage of the switching element 2050 under the ON/OFF control of the switching element drive unit 2040.

In this case, the bootstrap capacitor 2080 may receive the voltage $V_{IN'}$ different from the input voltage $V_{IN}$ input to the drain of the switching element 2050 through the first diode 2030. The supply voltage $V_{IN'}$ may be a voltage generated using the input voltage $V_{IN}$, or may be a voltage generated using a separate voltage. It will be apparent that although the supply voltage $V_{IN'}$ and the input voltage $V_{IN}$ are described as being different voltages in this embodiment, this embodiment is not limited thereto, and the input voltage $V_{IN}$ may be used as the supply voltage $V_{IN'}$.

In this case, the input voltage $V_{IN}$ input to the drain of the switching element 2050 may be a voltage output directly from a product, for example, the battery of a vehicle or automotive, or may be a voltage input through a specific circuit formed between the battery of the vehicle or automotive and the switching mode converter of this embodiment.

The switching element drive unit 2040 inputs the charging voltage of the bootstrap capacitor 2080 to the gate of the switching element 2050 through control using a switching element drive signal, for example, a PWM signal DRV.

When the switching element 2050 is turned off by the switching element drive unit 2040, the second diode 2090 is turned on and the voltage of a node between the second diode 2090 and the switching element 2050 is lowered to a voltage approximate to 0, in accordance with the operating characteristics of the buck topology (the arrangement of the inductor 2110 and the capacitor 2120) of the switching mode converter. In this case, the first diode 2030 is also turned on, and thus a current flows from the supply voltage $V_{IN'}$ through the first diode 2030 to the bootstrap capacitor 2080, thereby charging the bootstrap capacitor 2080 primarily with the current.

When the switching element 2050 is turned on by the switching element drive unit 2040, the second diode 2090 is turned off, and the voltage of the node between the second diode 2090 and the switching element 2050 is raised to a voltage proximate to the input voltage $V_{IN}$. Since the bootstrap capacitor 2080 is not charged through the first diode 2030 when the switching element 2050 is in an ON state, the charging state of the bootstrap capacitor 2080 is deteriorated because of the leakage current of the bootstrap capacitor 2080 when the switching element 2050 is continuously kept turned on for a long period, with the result that a problem arises in that the input voltage $V_{IN}$ transfer efficiency of the switching element 2050 is deteriorated. In this case, the common charge pump 2010 and the current source 2020 may be used to compensate for the gate voltage of the switching element 2050 and the charging state of the bootstrap capacitor 2080. However, the charge pump 2010 and the current source 2020 are not necessarily used to compensate for the charging state of the bootstrap capacitor 2080, but a method of compensating for the charging state using a separate bootstrap circuit or a charge pump may be used.

In this case, the leakage current of the bootstrap capacitor 2080 is a relatively small value, and may be too small to accurately model and compensate for it in a common design process. In the case of compensation using the charge pump 2010 and the current source 2020, when the leakage current is compensated using a separate bootstrap circuit or charge pump, it is difficult to accurately model and compensate for the leakage current of the bootstrap capacitor 2080, and thus, in practice, there is a possibility of a charge higher than the leakage current being transferred to the bootstrap capacitor 2080 in the process of compensation.

If a phenomenon in which a charge higher than the leakage current is transferred to the bootstrap capacitor 2080 is repeated in the process of compensating for the leakage current, the gate-source voltage of the switching element 2050 is raised to a voltage equal to or higher than a threshold voltage, and thus there is a possibility of the safety of the switching element 2050 being jeopardized.

In this case, when an excessive voltage, for example, a voltage equal to or higher than a predetermined threshold voltage, is applied to the gate of the switching element 2050, the switching element drive unit 2040 may turn off the switching element 2050. When the gate voltage or the charging voltage of the bootstrap capacitor 2080 is detected by the control unit 2060 or it is determined by the control unit 2060 that an excessive voltage is applied to the gate, the switching element drive unit 2040 may turn off the switching element 2050. Alternatively, the switching element drive unit 2040 may turn off the switching element 2050 through the detection of a separate detection means.

The discharge unit 2070 is connected to the gate terminal of the switching element 2050 and the ground, and functions to discharge a voltage applied to the gate of the switching element 2050 under the control of the control unit 2060.

In this case, the discharge unit 2070 may be implemented using a discharge element, such as a PMOS, or may be implemented using an element that may perform a discharge function and may be manufactured via a process that can be easily applied to a controller of vehicle or automotive and the like.

That is, the discharge unit 2070 is configured to provide a discharge path for an excessive voltage applied to or remaining at the gate terminal of the switching element 2050. The discharge unit 2070 functions to prevent the switching element 2050 from being damaged by an excessive voltage applied to the gate terminal, and to protect circuits disposed downstream of the switching element 2050 against an excessive voltage.

Furthermore, although the discharge unit 2070 may be implemented using a single discharge element, this embodiment is not limited thereto. Alternatively, the discharge unit 2070 may be implemented using a plurality of discharge elements. The number of discharge elements may vary depending on the range of voltages to be discharged.

The control unit 2060 determines whether a voltage input to the gate terminal of the switching element 2050 is an excessive voltage higher than a predetermined threshold voltage, and, if it is determined that the input voltage is an excessive voltage, controls the discharge unit 2070 so that the excessive voltage applied to the gate terminal is discharged via the discharge unit 2070.

In this case, the control unit 2060 connects the gate terminal and the ground via the discharge unit 2070, thereby discharging an excessive voltage via the discharge unit 2070.

The control unit 2060 may compare the charging voltage of the bootstrap capacitor 2080 with a predetermined first voltage, and, if the charging voltage is equal to or higher than the first voltage, may determine that a voltage input to the gate terminal of the switching element 2050 is an excessive voltage.

As described above, the control unit 2060 may determine whether the voltage applied to the gate terminal is an excessive voltage by comparing the voltage of the gate terminal with a threshold voltage, or may determine whether the voltage applied to the gate terminal is an excessive voltage by comparing the charging voltage of the bootstrap capacitor 2080 with the first voltage. In order to protect the switching element 2050, it is preferable to determine whether the voltage applied to the gate terminal is an excessive voltage by comparing the charging voltage of the bootstrap capacitor 2080 with the first voltage.

Furthermore, if it is determined that an excessive voltage has been applied to the gate of the switching element 2050, the control unit 2060 controls a signal DRV input to the switching element drive unit 2040 so that the switching element 2050 is turned off by the switching element drive unit 2040.

That is, the control unit 2060 turns off the switching element 2050, and controls the discharge unit 2070 so that an excessive voltage applied to the gate can be discharged via the discharge unit 2070.

Furthermore, the control unit 2060 may adjust the time at which the excessive voltage of the gate is discharged via the discharge unit 2070. The control unit 2060 may adjust the number of discharge elements depending on the range of the excessive voltage if the discharge unit 2070 includes a plurality of discharge elements.

As described above, the control unit 2060 determines whether an excessive voltage is applied to the gate of the switching element, and discharges the excessive voltage using the discharge element connected to the gate if the excessive voltage is applied, thereby preventing the switching element from being damaged by the excessive voltage applied to the gate and also protecting circuits disposed downstream of the switching element by protecting the switching element.

Depending on the situations, the control unit 2060 may connect the charge pump 2010 and the bootstrap capacitor 2080 with each other if a predetermined condition is fulfilled when the switching element 2050 is in an ON state, and may additionally charge the bootstrap capacitor 2080 using the high voltage of the charge pump 2010.

In this case, the predetermined condition may be that the period during which the switching element 2050 has been in an ON state is equal to or longer than a predetermined threshold value, or that the gate-source voltage of the switching element 2050 falls below a predetermined threshold voltage.

The switching element 2050 is turned on and off by the charging voltage of the bootstrap capacitor 2080 charged with the output voltage of the charge pump 2010 or the output current of the current source 2020 and the supply voltage $V_{IN}$, and by the PWM control of the switching element drive unit 2040, converts the input voltage $V_{IN}$ to the output voltage of the switching mode converter, and outputs the converted output voltage.

In this case, the output voltage of the switching element 2050 may be determined by the gate voltage and the input voltage $V_{IN}$, and the switching element 2050 is connected to the input voltage $V_{IN}$ and the second diode 2090.

The second diode 2090 may be connected to the ground and the switching element 2080. By using the second diode 2090, an asynchronous switching mode converter may be implemented.

It will be apparent that the second diode 2090 may be replaced with another switching element transistor. By using the switching element, a synchronous switching mode converter may be implemented.

That is, according to the present invention, by forming a first semiconductor device including any one of the diode or another switching element between the ground and the switching element 2050, a synchronous or asynchronous switching mode converter may be implemented.

The inductor 2110 outputs an output voltage Vout to an output capacitor 2130 and an output load resistor 2140 using a voltage that is output in response to the turning on or off of the switching element 2050.

As described above, the switching mode converter according to this embodiment of the present invention may discharge an excessive voltage applied to the gate of the switching element using an discharge element, such as a PMOS or the like, without using an Zener diode, thereby achieving the advantages of increasing the range of selection of applicable processes and thus being easily applied to a controller of vehicle or automotive and the like.

Furthermore, the switching mode converter according to this embodiment of the present invention may prevent the gate voltage of the switching element from being raised to a voltage above a required voltage, thereby protecting the switching element, with the result that the reliability of the switching mode converter can be improved.

Figure 21:
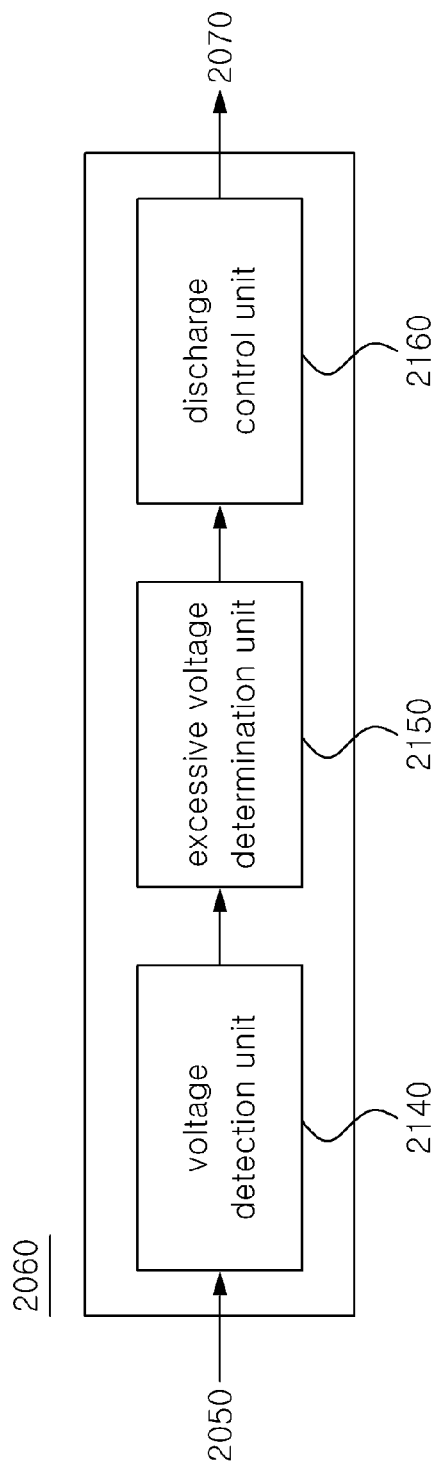
FIG. 21 illustrates the configuration of an embodiment of the control unit illustrated in FIG. 20.

FIG. 21 illustrates the configuration of an embodiment of the control unit illustrated in FIG. 20.

Referring to FIG. 21, the control unit 2060 includes a voltage detection unit 2140, an excessive voltage determination unit 2150, and a discharge control unit 2160.

The voltage detection unit 2140 detects a voltage applied to the gate of the switching element.

In this case, the voltage detection unit 2140 may detect a voltage applied to the gate of the switching element as the charging voltage of the bootstrap capacitor.

The excessive voltage determination unit 2150 determines whether a voltage applied to the gate of the switching element is an excessive voltage using a voltage that is detected by the voltage detection unit 2140.

As an example, when the voltage detection unit 2140 directly detects a voltage applied to the gate, the excessive voltage determination unit 2150 compares the voltage applied to the gate with a predetermined threshold voltage in order to determine whether the voltage applied to the gate is an excessive voltage, and may determine whether the voltage applied to the gate is an excessive voltage if the voltage applied to the gate is equal to or higher than the threshold voltage.

As another example, when the voltage detection unit 2140 detects the charging voltage of the bootstrap capacitor, the excessive voltage determination unit 2150 compares the charging voltage with a predetermined first voltage in order to determine whether the charging voltage is an excessive voltage, and may determine whether the voltage applied to the gate is an excessive voltage if the charring voltage is equal to or higher than the predetermined first voltage.

In this case, the first voltage and the threshold voltage may have the same value, or may have different values.

The discharge control unit 2160 controls whether to discharge using the discharge unit 2070 based on the results of the determination of the excessive voltage determination unit 2150.

That is, the discharge control unit 2160 discharges the voltage applied to the gate of the switching element through the discharge unit 2070 if it is determined by the excessive voltage determination unit 2150 that the voltage in question is an excessive voltage, and controls the discharge unit 2070 so that the discharge unit 2070 is kept turned off if it is determined that the voltage in question is not an excessive voltage.

Furthermore, the discharge control unit 2160 may control the switching mode converter so that the switching element is turned off if it is determined by the excessive voltage determination unit 2150 that the voltage in question is an excessive voltage.

Figure 22:
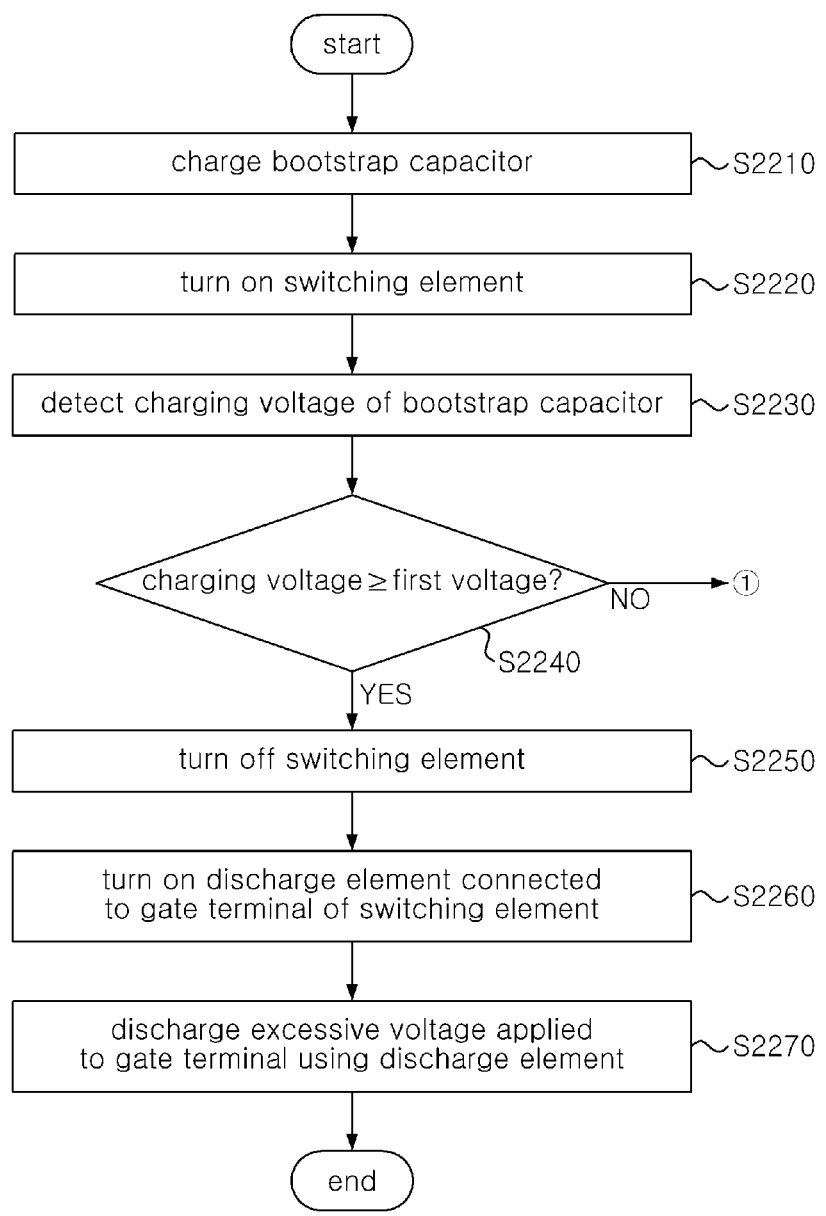
FIG. 22 is an operational flowchart illustrating a method of controlling a switching mode converter according to still another embodiment of the present invention.

FIG. 22 is an operational flowchart illustrating a method of controlling a switching mode converter according to still another embodiment of the present invention.

Referring to FIG. 22, in the method of controlling a switching mode converter, the bootstrap capacitor connected to one side of a first semiconductor device, for example, a diode or a transistor, the other side of which is connected to the ground is charged at step S2210.

In this case, the bootstrap capacitor may be charged in the state in which the input power and the switching element, which is connected to the one side of the first semiconductor device, have been turned off.

Once the bootstrap capacitor has been charged, the input power and the switching element, which is connected to the one side of the first semiconductor device, are turned on at step S2220, and the charging voltage of the bootstrap capacitor is detected at step S2230.

Once the charging voltage of the bootstrap capacitor has been detected at step S2230, it is determined whether the detected charging voltage is equal to or higher than a predetermined first voltage at step S2240.

In this case, the first voltage may be a voltage that is used to determine whether a voltage applied to the gate terminal of the switching element is equal to or higher than a predetermined threshold voltage, that is, an excessive voltage, and the first voltage has a value that is the same as or higher than that of the threshold voltage.

Steps S2230 and S2240 are steps that are used to determine whether a voltage applied to the gate terminal of the switching element is equal to or higher than a predetermined specific voltage. Alternatively, it may be possible to detect the gate terminal voltage of the switching element and to determine whether the detected voltage of the gate terminal is equal to or higher than a specific voltage.

If, as a result of the determination at step S2240, it is determined that the charging voltage is equal to or higher than the first voltage, it is determined that the voltage applied to the gate terminal of the switching element is equal to or higher than an excessive voltage, and the switching element is turned off in order to prevent the switching element from being damaged because of the excessive voltage at step S2250.

After the switching element has been turned off, at least one or more discharge elements connected to the gate terminal of the switching element and the ground are turned on at step S2260, and thus an excessive voltage applied to the gate terminal is discharged using the discharge element at step S2270.

In this case, the discharge element may be disposed between the gate terminal and the ground, and may form a discharge path to the ground.

Figure 23:
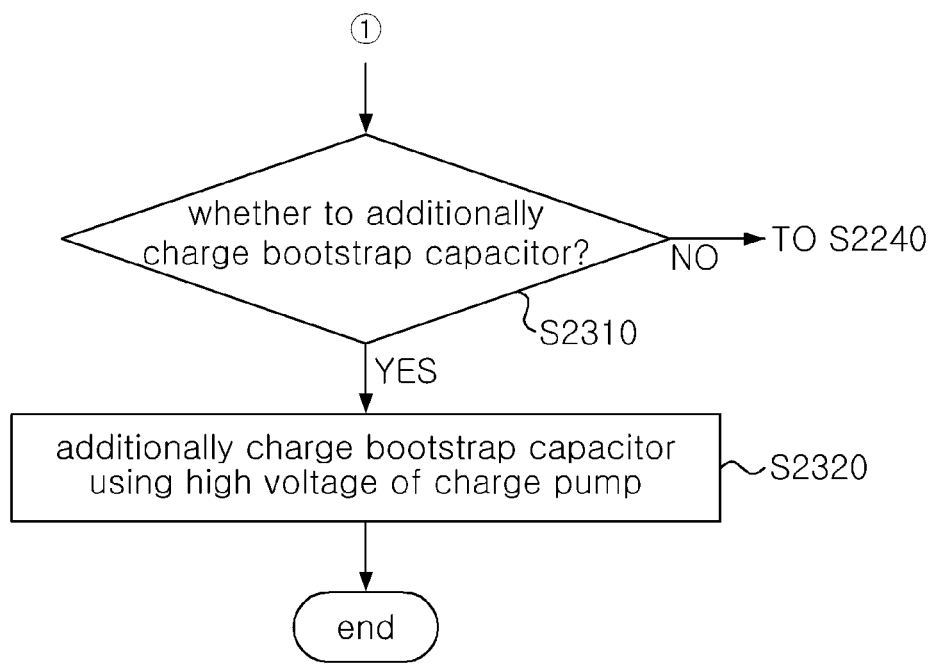
FIG. 23 is an additional operational flowchart of the present invention illustrated in FIG. 22.

FIG. 23 is an additional operational flowchart of the embodiment illustrated in FIG. 22.

Referring to FIG. 23, once the switching element has entered an ON state through step S2220, it is determined whether the additional charging of the bootstrap capacitor is required at step S2310, and, if the additional charging of the bootstrap capacitor is required, the charge pump and the bootstrap capacitor are connected to each other, and the bootstrap capacitor is additionally charged using the high voltage of the charge pump at step S2320.

In this case, the operations of FIG. 22 and FIG. 23 may be controlled by a control circuit including the control unit 2060, discharge unit 2070, and the switching element drive unit 2040.

In this case, whether the additional charging of the bootstrap capacitor is required may be determined based on a predetermined condition. In this case, the predetermined condition may be that the period during which the switching element has been in an ON state is equal to or longer than a predetermined threshold value, or that the gate-source voltage of the switching element falls below a second threshold voltage.

The present invention is configured to control the charging of the bootstrap capacitor and the gate voltage of the switching element using the common charge pump, thereby enabling more easily a switching mode converter included in an SoC to be implemented, and is also configured to control the charging of the bootstrap capacitor by controlling the output current of the current source connected to the output terminal of the common charge pump, thereby providing a safe bootstrap function.

Furthermore, the present invention is configured to control the output current level of the current source or the ON and OFF states of the output current based on the charging voltage of the bootstrap capacitor, thereby preventing the gate voltage of the switching element from increasing above a required voltage and thus protecting the switching element. Therefore, the present invention can improve the reliability of the switching mode converter.

Furthermore, the present invention is configured to provide a safe bootstrap function through the current control of the current source, thereby not requiring additional external capacitors and thus preventing the cost of products from increasing.

Furthermore, the present invention is configured to use two reference voltages corresponding to the output voltage levels of the common charge pump, to switch between the two reference voltages depending on whether the switching mode converter is in 100% duty cycle mode, and to control the level of a reference voltage selected in the case of 100% duty cycle mode while taking into account the input voltage of the switching element or the output voltage of the converter, thereby providing a stable output voltage of the converter even when the input voltage of the switching element drops to a voltage equal to or lower than a specific voltage and also providing stable 100% duty cycle mode using the common charge pump.

Furthermore, the present invention is configured to control the level of a reference voltage selected in the case of 100% duty cycle mode while taking into account the input voltage of the switching element or the output voltage of the converter, thereby preventing the gate voltage of the switching element from increasing above a required voltage and thus protecting the switching element. Therefore, the present invention can improve the reliability of the switching mode converter.

Furthermore, the present invention is configured to provide stable 100% duty cycle mode through the output voltage control of the common charge pump, thereby not requiring additional external capacitors and thus preventing the cost of products from increasing.

Furthermore, the present invention is configured to detect the charging voltage of the bootstrap capacitor and discharge the gate voltage of the switching element if the detected charging voltage of the bootstrap capacitor is equal to or higher than a predetermined specific voltage, thereby preventing the switching element from being damaged because of the application of an excessive voltage to the gate of the switching element.

Furthermore, the present invention is configured to discharge the gate voltage of the switching element using a discharge element, such as a PMOS, without using a Zener diode, thereby increasing the range of selection of applicable processes when the present invention is applied to a controller of vehicle or automotive and the like.

Furthermore, the present invention is configured to prevent an excessive voltage that may be applied to the gate of the switching element, thereby preventing the switching element from being damaged and thus protecting circuits at stages downstream of the switching element.

Furthermore, the present invention is configured to enable more easily a switching mode converter included in an SoC to be implemented when the common charge pump is employed, and is configured to prevent the excessive voltage of the gate, thereby ensuring the stable operation of the switching mode converter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A switching mode converter, comprising:
a switching element connected between one side of a first semiconductor device and an input power, wherein another side of the first semiconductor device is connected to a ground power;
a bootstrap capacitor configured such that one side of the bootstrap capacitor is connected to the one side of the first semiconductor device;
a control unit configured to control a first output current or a first output voltage of a common charge pump provided to the switching element and the bootstrap capacitor in order to control a charging state of the bootstrap capacitor and a gate voltage of the switching element; and
a current source connected between an output terminal of the common charge pump and other side of the bootstrap capacitor, wherein the control unit controls a second output current of the current source based on:
a charging voltage of the bootstrap capacitor; and
a relationship between the charging voltage of the bootstrap capacitor and the second output current of the current source wherein the relationship requires an increased level of the second output current of the current source when the charging voltage of the bootstrap capacitor decreases.

2. The switching mode converter of claim 1, wherein the control unit is further configured to detect the charging voltage of the bootstrap capacitor.

3. The switching mode converter of claim 1, wherein the current source is further configured to provide the second output current having linearly regulated level controlled by the control unit.

4. A switching mode converter, comprising:
a switching element connected between one side of a first semiconductor device and an input power, wherein another side of the first semiconductor device is connected to a ground power;
a bootstrap capacitor configured such that one side of the bootstrap capacitor is connected to the one side of the first semiconductor device;
a common charge pump is configured to:
receive one of a first reference voltage and a second reference voltage as an input reference voltage; and
provide a first output voltage corresponding to the received one reference voltage to other side of the bootstrap capacitor; and
a control unit is configured to:
control a first output current or the first output voltage of the common charge pump provided to the switching element and the bootstrap capacitor in order to control a charging state of the bootstrap capacitor and a gate voltage of the switching element;
determine when a duty cycle of the switching element is 100%;
determine that the second reference voltage is input to the common charge pump when the duty cycle is 100%; and
adjust a voltage level of the second reference voltage based on a status of the switching element when the duty cycle is 100%.

5. The switching mode converter of claim 4, wherein the control unit is further configured to:
adjust the voltage level of the second reference voltage in response to a voltage level of the input power when the duty cycle is 100%; and
input the second reference voltage having the adjusted voltage level to the common charge pump.

6. The switching mode converter of claim 4, wherein the control unit is further configured to:
adjust the voltage level of the second reference voltage in response to an output voltage of the switching mode converter when the duty cycle is 100%; and
input the second reference voltage having the adjusted voltage level to the common charge pump.

7. The switching mode converter of claim 4, wherein the control unit is further configured to determine that the duty cycle is 100% if a detected ON-time of the switching element is equal to or longer than a predetermined reference time upon detecting the ON-time or if a detected charging voltage of the bootstrap capacitor is equal to or lower than a predetermined threshold voltage upon detecting the charging voltage.

8. A method of controlling a switching mode converter, comprising:
charging, by a control circuit, a bootstrap capacitor configured such that one side thereof is connected to one side of a first semiconductor device, another side of the first semiconductor device is connected to a ground power;
turning on, by the control circuit, a switching element connected between the one side of the first semiconductor device and an input power;
controlling, by the control circuit, a first output current or a first output voltage of a common charge pump provided to the switching element and the bootstrap capacitor in order to control a charging state of the bootstrap capacitor and a gate voltage of the switching element; and
controlling, by the control circuit, a second output current of a current source connected between an output terminal of the common charge pump and other side of the bootstrap capacitor, based on:
a charging voltage of the bootstrap capacitor; and
a relationship between the charging voltage of the bootstrap capacitor and the second output current of the current source wherein the relationship requires an increased level of the second output current of the current source when the charging voltage of the bootstrap capacitor decreases.

9. The method of claim 8, further comprising detecting, by the control circuit, the charging voltage of the bootstrap capacitor.

10. A method of controlling a switching mode converter, comprising:
charging, by a control circuit, a bootstrap capacitor configured such that one side thereof is connected to one side of a first semiconductor device, another side of the first semiconductor device is connected to a ground power;
turning on, by the control circuit, a switching element connected between the one side of the first semiconductor device and an input power;
controlling, by the control circuit, a first output current or a first output voltage of a common charge pump provided to the switching element and the bootstrap capacitor in order to control a charging state of the bootstrap capacitor and a gate voltage of the switching element;

controlling the common charge pump, by the control circuit, to receive one of a first and reference voltage and a second reference voltage and to provide the first output voltage corresponding to the received one reference voltage to the other side of the bootstrap capacitor;

determining, by the control circuit, whether a duty cycle of the switching element is 100%;

selecting, by the control circuit, the second reference voltage is input to the common charge pump when the duty cycle is 100%; and adjusting, by the control circuit, a voltage level of the second reference voltage based on a status of the switching element when the duty cycle is 100%.

11. The method of claim 10, wherein the adjusting is further configured to:

adjusting, by the control circuit, the voltage level of the second reference voltage in response to a voltage level of the input power when the duty cycle is 100%; and controlling, by the control circuit, the second reference voltage having the adjusted voltage level to be input to the common charge pump.

12. The method of claim 10, wherein the adjusting is further configured to:

adjusting, by the control circuit, a voltage level of the second reference voltage in response to an output voltage generated based on a topology of the switching mode converter including the switching element, an inductor and a capacitor when the duty cycle is 100%, and controlling, by the control circuit, the second reference voltage having the adjusted voltage level to be input to the common charge pump.

* * * * *